United States Patent
Jang et al.

(10) Patent No.: US 10,690,040 B2
(45) Date of Patent: Jun. 23, 2020

(54) FLOW CONTROL VALVE AND METHOD OF CONTROLLING THE SAME

(71) Applicants: HYUNDAI MOTOR COMPANY, Seoul (KR); KIA MOTORS CORPORATION, Seoul (KR)

(72) Inventors: Jae Soo Jang, Hwaseong-si (KR); Cheol Soo Park, Suwon-si (KR); Bong Hoon Han, Seoul (KR); Dong Suk Chae, Seoul (KR); Jun Sik Park, Seoul (KR); Phil Gi Lee, Suwon-si (KR); Jea Woong Yi, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 15/585,791

(22) Filed: May 3, 2017

(65) Prior Publication Data
US 2017/0321595 A1    Nov. 9, 2017

(30) Foreign Application Priority Data

May 4, 2016    (KR) .......................... 10-2016-0055660

(51) Int. Cl.
*F01P 7/16* (2006.01)
*F16K 5/12* (2006.01)
(Continued)

(52) U.S. Cl.
CPC ................. *F01P 7/16* (2013.01); *F01P 7/167* (2013.01); *F16K 5/12* (2013.01); *F16K 11/0876* (2013.01);
(Continued)

(58) Field of Classification Search
CPC ........ F01P 7/16; F01P 7/167; F01P 2007/146; F01P 2025/60; F16K 5/0407; F16K 11/0856; F16K 27/065
(Continued)

(56) References Cited

U.S. PATENT DOCUMENTS 5,617,815 A * 4/1997 Spies ..................... F16K 11/076
123/41.1
6,681,805 B2 * 1/2004 McLane ............. B60H 1/00485
137/625.16
(Continued)

FOREIGN PATENT DOCUMENTS

DE    102014206480 A1    10/2015
FR        2849673 A1    7/2004
(Continued)

OTHER PUBLICATIONS

Extended European Search Report dated Sep. 29, 2017 issued in European Patent Application No. 17169494.6.

*Primary Examiner* — Joseph J Dallo
*Assistant Examiner* — Yi-Kai Wang
(74) *Attorney, Agent, or Firm* — Morgan, Lewis & Bockius LLP

(57) ABSTRACT

The present invention relates to a technology that can simultaneously control the flow rate of a coolant and perform variable separate cooling by controlling the opening rate of a flow control valve. The flow control valve has an inlet port connected to a coolant outlet of a cylinder block and a plurality of outlet ports connected to a cooling inlet port of an engine such that the opening rate of a first outlet port is symmetrically changed in a first direction and a second direction from a mid-operation angle of the entire operation section of the flow control valve.

33 Claims, 17 Drawing Sheets

(51) Int. Cl.
    *F16K 11/087*     (2006.01)
    *F01P 7/14*     (2006.01)

(52) U.S. Cl.
    CPC ..... *F01P 2007/146* (2013.01); *F01P 2025/60* (2013.01)

(58) Field of Classification Search
    USPC ..................................................... 123/41.08
    See application file for complete search history.

(56) References Cited

U.S. PATENT DOCUMENTS

| | | | |
|---|---|---|---|
| 2013/0221116 A1* | 8/2013 | Tsuchiya | F01P 7/14 236/34.5 |
| 2015/0027572 A1* | 1/2015 | Morein | F16K 11/0876 137/625.19 |
| 2016/0010536 A1 | 1/2016 | Murakami et al. | |

FOREIGN PATENT DOCUMENTS

| | | |
|---|---|---|
| JP | 2004-137981 A | 5/2004 |
| JP | 2012-241610 A | 12/2012 |
| KR | 10-1558394 B1 | 10/2015 |
| KR | 10-1601234 B1 | 3/2016 |
| KR | 10-1628127 B1 | 6/2016 |
| KR | 10-1683530 B1 | 12/2016 |
| WO | 2016/045895 A1 | 3/2016 |

\* cited by examiner

# FLOW CONTROL VALVE AND METHOD OF CONTROLLING THE SAME

CROSS REFERENCE TO RELATED APPLICATION

The present application claims priority to Korean Patent Application No. 10-2016-0055660, filed May 4, 2016, the entire contents of which is incorporated herein for all purposes by this reference.

BACKGROUND OF THE INVENTION

Field of the Invention

The present invention relates to a coolant flow control valve that can control the flow rates for a heat exchanger and other cooling parts in a vehicle, depending on the opening rate thereof, and can separately cool a cylinder head and a cylinder block in variable way, and a method of controlling the flow control valve.

Description of the Related Art

The engine of a vehicle shows poor fuel efficiency under a cold starting condition in comparison to when it has been sufficiently warmed up. The reason is because, under a cold starting condition, friction in the engine is increased due to high viscosity of oil due to low temperature oil, a large amount of heat is lost through the walls of cylinders due low temperature wall, and combustion is unstable.

Accordingly, it is required to quickly increase the temperature of the engine of a vehicle up to normal temperature in the early stage of engine start in order to improve the fuel efficiency and durability of the engine.

The description provided above as a related art of the present invention is only for helping understanding the background of the present invention and should not be construed as being included in the related art known by those skilled in the art.

SUMMARY OF THE INVENTION

The present invention has been made in an effort to solve the problems described above and an object of the present invention is to provide a flow control valve that can perform both of coolant flow rate control and variable split cooling by controlling the opening rate of the flow control valve, and a method of controlling the flow control valve.

A flow control valve according to an aspect of the present invention is independently connected to a coolant outlet of a cylinder block and a coolant outlet of a cylinder head, has an inlet port connected to the coolant outlet of the cylinder block to receive a coolant, and has at least three outlet ports for discharging the coolant from an engine, in which the at least three outlet ports include a first outlet port connected to a radiator, and the flow control valve is configured that an opening rate of the first outlet port is symmetrically changed in a first direction and a second direction from a mid-operation of the entire operation angle of the flow control valve.

The opening rate of the first outlet port may be maximized in a maximum cooling section including the mid-operation angle of the flow control valve.

The opening rate of the first outlet port may gradually decrease, as the flow control valve is operated in the first direction or the second direction from the maximum cooling section including the mid-operation angle.

The opening rate of the first outlet port may be minimized before the operation angle of the flow control valve reaches a first end and a second end from the maximum cooling section.

The opening rate of the inlet port may become minimum and maximum, as the flow control valve is operated in the first direction and the second direction, respectively, from the mid-operation angle of the flow control valve.

The outlet ports may include a second outlet port connected to an oil heat exchanger or an EGR cooler, and a third outlet port connected to a heater core, and the opening rates of the second outlet port and the third outlet port may be set such that the second outlet port and the third outlet port are partially opened in the maximum cooling section.

The outlet ports may include a second outlet port connected to an oil heat exchanger or an EGR cooler, and a third outlet port connected to a heater core, and the opening rates of all of the first outlet ports, the second outlet ports, the third outlet port, and the inlet port may be set to be minimum in a flow stop section including a first operation limit angle at the first end of the entire operation angle of the flow control valve.

In a warming-up section between the flow stop section and the mid-operation angle, the opening rates of the first outlet port and the inlet port may be minimum, the opening rate of the second outlet port may be changed between the minimum and the maximum, depending on an operation angle change of the flow control valve, and the opening rate of the third outlet port may be changed, depending on the operation angle change of the flow control valve.

In the warming-up section, the opening rate of the second outlet port may gradually increase, as the flow control valve is operated from a first operation limit angle to the mid-operation angle, and the opening rate of the third outlet port may be gradually increased and then maintained at a predetermined opening rate that is smaller than a maximum opening rate, as the flow control valve is operated from the first operation limit angle to the mid-operation angle.

In a first variable operation section between the warming-up section and the maximum cooling section, the opening rate of the first outlet port may be changed between the minimum and the maximum, depending on the operation angle change of the flow control valve, the opening rate of the second outlet port may be maximum, the opening rate of the third outlet port is set such that the third outlet port is partially opened, and the opening rate of the inlet port may be minimum.

In the first variable operation section, the opening rate of the first outlet port may gradually increase, as the flow control valve is operated along a direction from a first operation limit angle to the mid-operation angle.

The outlet ports may include the third outlet port connected to the heater core, and an opening rate of the third outlet port may be maximum in a heating priority operation section including a second operation limit angle at the second end of the entire operation angle of the flow control valve.

In the heating priority operation section, the opening rate of the first outlet port may be minimum, the opening rate of the second outlet port may be changed between the minimum and the maximum, depending on the operation angle change of the flow control valve, and the opening rate of the inlet port may be maximum.

In the heating priority operation section, the opening rate of the second outlet port may gradually increase, as the flow control valve is operated along a direction from a second operation limit angle to the mid-operation angle.

In a second variable operation section between the heating priority operation section and the maximum cooling section, the opening rate of the first outlet port may be changed between the minimum and the maximum, depending on the operation angle change of the flow control valve, and the opening rates of the second outlet port and the third outlet port may be changed, depending on the operation angle change of the flow control valve, and the opening rate of the inlet port is maximum.

In the second variable operation section, the opening rate of the first outlet port may gradually increase, as the flow control valve is operated along a direction from the second operation limit angle to the mid-operation angle, the opening rate of the second outlet port may be maintained at the maximum opening rate and then gradually decreased over the minimum opening rate, and the opening rate of the third outlet port may gradually decrease over the minimum opening rate, as the flow control valve is operated along the direction from the second operation limit angle to the mid-operation angle.

The flow control valve may further include a controller that maintains the flow control valve in the flow stop section when the engine is started and coolant temperature is a reference temperature or higher.

The controller may position the flow control valve to a first warming-up section bordering on the flow stop section of the warming-up section, when the coolant temperature is equal to or higher than a first target temperature that is higher than the reference temperature in the flow stop section; and may position the flow control valve to a second warming-up section bordering on the first variable operation section of the warming-up section, when the coolant temperature is equal to or higher than a second target temperature that is higher than the first target temperature, a heater is turned on, or the engine is currently operated in an area exceeding a first engine operation map determined from relationship between an engine speed and an engine load, in the first warming-up section.

In the warming-up section, the controller may control the flow control valve such that as the coolant temperature increases, the opening rate of the second outlet port gradually increases.

When the heater is turned on or the engine is operated in an area exceeding a first engine operation map determined from relationship between an engine speed and an engine load in the flow stop section, the controller may position the flow control valve to a second warming-up section bordering on the first variable operation section of the warming-up section.

When the coolant temperature is equal to or higher than a third target temperature that is higher than the second target temperature or the engine is currently operated in an area exceeding a second engine operation map that is smaller than the first engine operation map in the second warming-up section, the controller may position the flow control valve to the first variable operation section.

The controller may position the flow control valve to the maximum cooling section when the coolant temperature is equal to or higher than a fourth target temperature that is higher than the third target temperature in the first variable operation section; and may position the flow control valve to the first variable operation section when the coolant temperature is equal to or lower than a fifth target temperature that is lower than the fourth target temperature and the engine is currently operated in the second engine operation map in the maximum cooling section.

The controller may position the flow control valve to the second variable operation section when the engine is currently operated in an area exceeding the second engine operation map in the first variable operation section; and may position the flow control valve to the first variable operation section when the engine is currently operated in a third engine operation map that is smaller than the second engine operation map in the second variable operation section.

The controller may position the flow control valve to the maximum cooling section when the coolant temperature is equal to or higher than a fourth target temperature that is higher than the third target temperature in the second variable operation section; and may position the flow control valve to the first variable operation section when the coolant temperature is equal to or lower than a fifth target temperature that is lower than the fourth target temperature and the engine is currently operated in an area exceeding the second engine operation map in the maximum cooling section.

When the engine is started and the coolant is lower than the reference temperature, the controller may position the flow control valve to the heating priority operation section.

In the warming-up section, when the coolant temperature is equal to or higher than a sixth target temperature that is higher than the reference temperature, the controller may control the flow control valve such that as the coolant temperature increases, the opening rate of the second outlet port gradually increases.

When the coolant temperature is equal to or higher than a seventh target temperature that is higher than the reference temperature, the controller may position the flow control valve to the second warming-up section bordering on the first variable operation section.

When the engine is in from a stop state to an ignition-on state before starting, the controller may position the flow control valve to a section in which all of the ports of the flow control valve are at least partially open.

When a signal showing a malfunction of the flow control valve is input, the controller may position the flow control valve to a section in which all of the ports of the flow control valve are at least partially open.

A flow control valve according to another aspect of the present invention is independently connected to a coolant outlet of a cylinder block and a coolant outlet of a cylinder head, has an inlet port connected to the coolant outlet of the cylinder block to receive a coolant, and has at least three outlet ports for discharging the coolant from an engine, in which the at least three outlet ports include: a first outlet port connected to a radiator; a second outlet port connected to an oil heat exchanger or an EGR cooler; and a third outlet port connected to a heater core.

According to another aspect of the present invention, there is provided a method of controlling a flow control valve that is independently connected to a coolant outlet of a cylinder block and a coolant outlet of a cylinder head, has an inlet port connected to the coolant outlet of the cylinder block to receive a coolant, and has at least three outlet ports for discharging the coolant from an engine, in which the outlet ports include a first outlet port connected to a radiator, and the first outlet port is symmetrically opened and closed in a first direction and a second direction from a mid-operation of the entire operation section of the flow control valve.

The first outlet port may be fully open in a maximum cooling section including the mid-operation angle of the flow control valve, and an opening rate of the first outlet port may gradually decrease, as the flow control valve is operated in the first direction or the second direction from the maximum cooling section.

The inlet port may be fully closed when the flow control valve is operated in the first direction from the mid-operation angle, and may be fully opened when the flow control valve is operated in the second direction.

According to the preset invention, since 4-port control that simultaneously controls three outlet ports and one inlet port by operating only the flow control valve is possible, it is possible to maximize fuel efficiency by simultaneously increasing the temperature of the entire engine, quickly warming up the engine, and performing separate cooling. Further, there is no need for a specific port control configuration for separate cooling, so manufacturing costs can be reduced.

Further, various control sections of the flow control valve are provided, depending on the operation conditions of a vehicle and the flow control valve is operated sequentially through the control sections, so the operation distance and the number of times of operation of the flow control valve are reduced Further, since the heating priority operation section is set, it is possible to maximize the flow rate to the heater core and prevent unnecessary loss of coolant that is supplied to the oil heat exchanger or the EGR cooler, so the fuel efficiency is improved and the heating performance is maximized. In addition, it is possible to maximize the cooling performance of a vehicle on a steep uphill slope.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Exemplary embodiments of the present invention will be described hereafter in detail with reference to the accompanying drawings.

Figure 1:
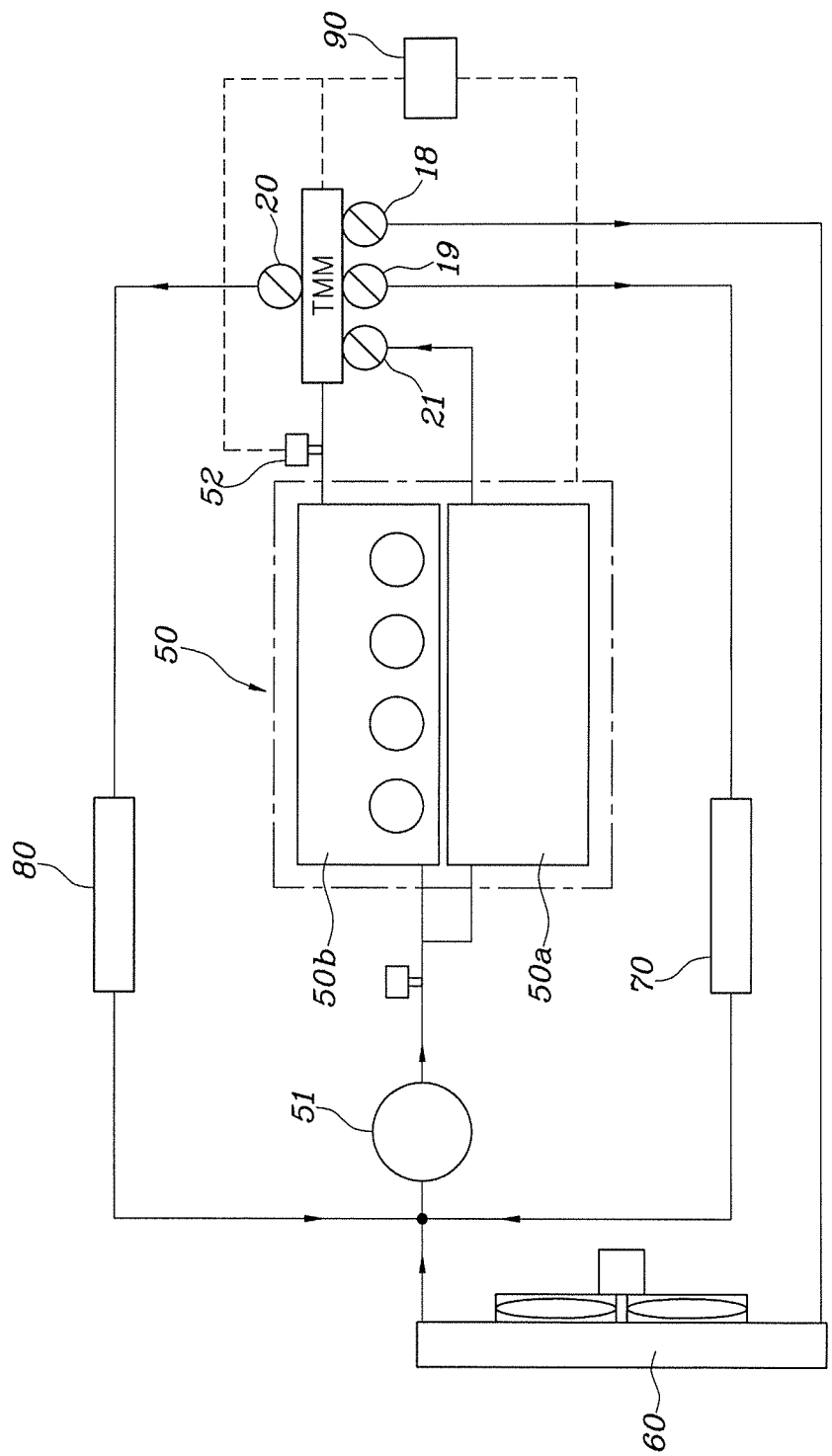
FIG. 1 is a view schematically showing the configuration of a cooling circuit including a flow control valve of the present invention.
Figure 2A:
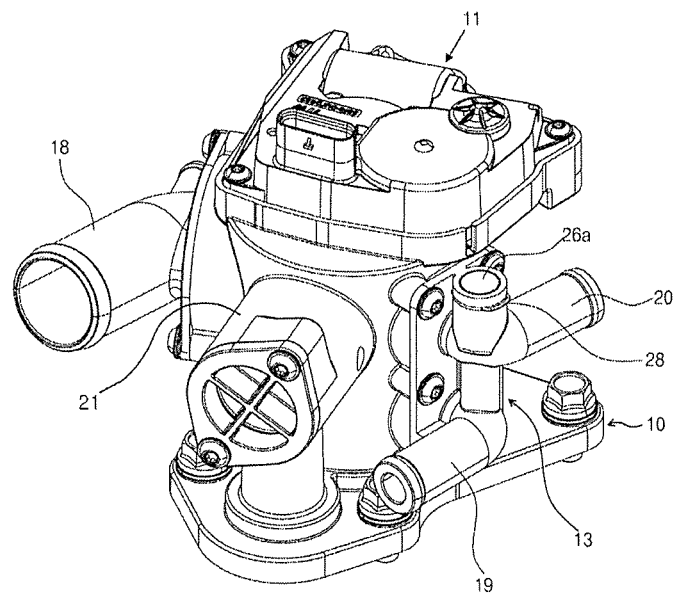
FIGS. 2A and 2B are a perspective view and an exploded perspective view according to a first embodiment of a flow control valve of the present invention.
Figure 2B:
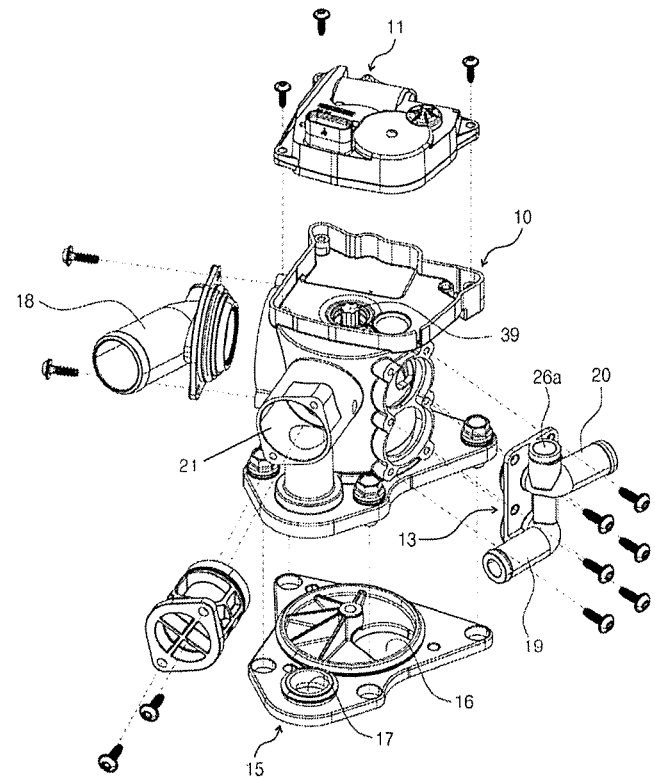
Figure 3:
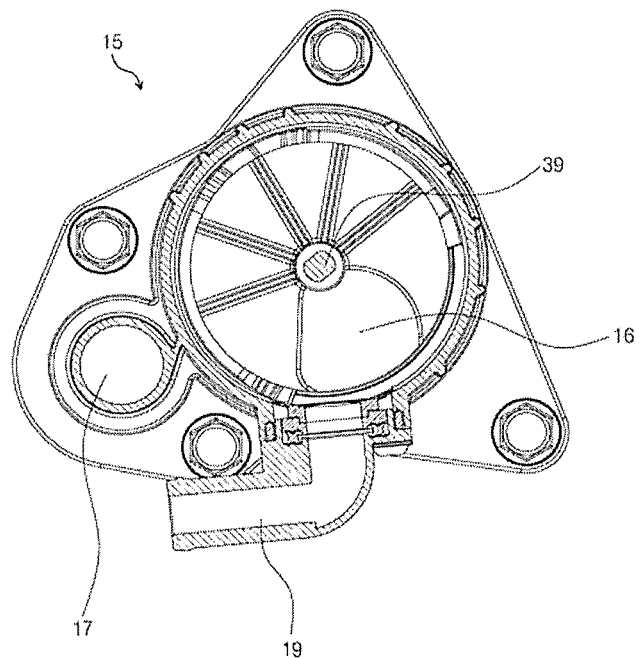
FIG. 3 is a cross-sectional view of the lower cover shown in FIG. 2B.
Figure 4:
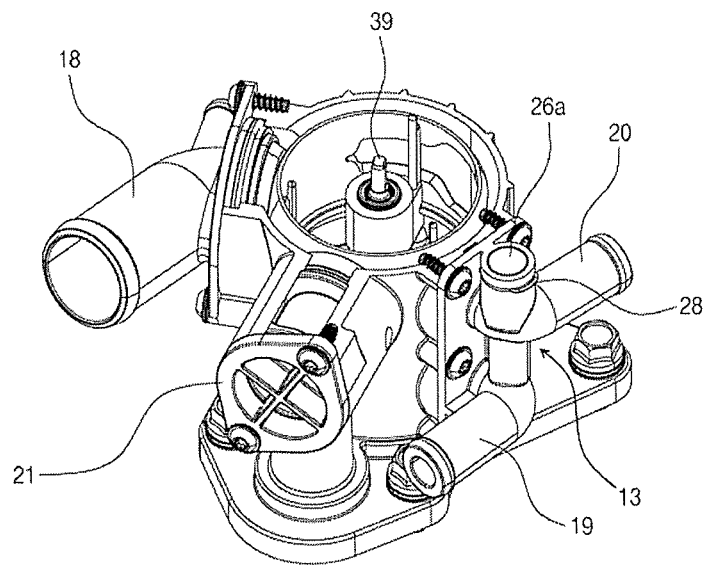
FIG. 4 is a partial cut perspective view for illustrating a configuration including the flow control valve shown in FIG. 2A.
Figure 5A:
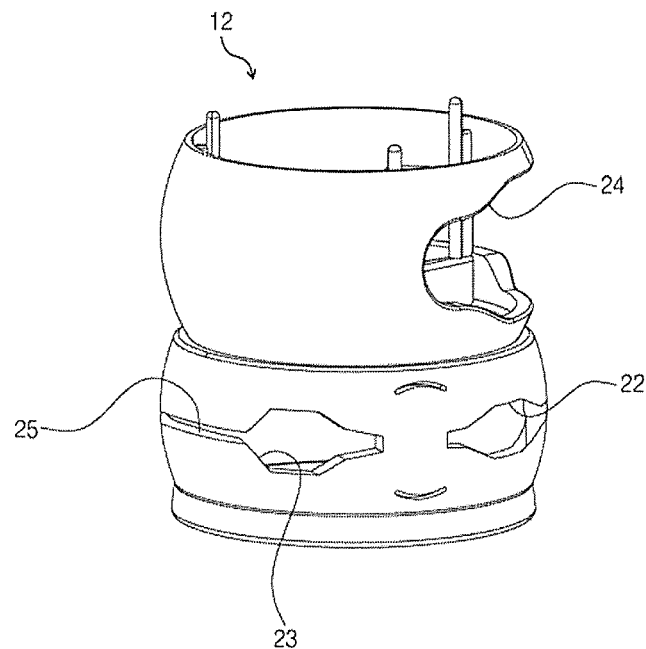
FIGS. 5A and 5B are perspective views showing the valve in the valve housing shown in FIG. 2B at different angles.
Figure 5B:
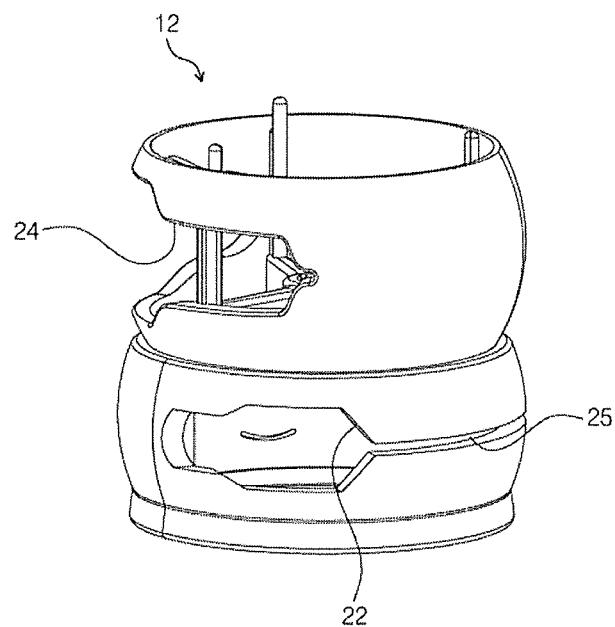

FIG. 1 is a view schematically showing a cooling circuit that can be applied to the present invention and a flow control valve 1 of the present invention may be included in the cooling circuit.

In detail, a coolant outlet of a cylinder block 50a and a coolant outlet of a cylinder head 50b in an engine are independently connected to the flow control valve 1.

An inlet port 21 is disposed at the flow control valve 1 and is connected to the coolant outlet of the cylinder block 50a, so the flow rate of the coolant flowing into the flow control valve 1 from the cylinder block 50a through the inlet port 21 can be controlled.

Further, the flow control valve 1 has at least three or more outlet ports and the outlet ports are finally connected to a coolant inlet of a water pump 51 mounted on the cylinder block 50a. The flow rate of the coolant discharged from the flow control valve 1 can be controlled.

The outlet ports may include a first outlet port 18, a second outlet port 19, and a third outlet port 20. The first outlet port 18 may be connected to a channel in which a radiator 60 is disposed, the second port 19 may be connected to a channel in which an oil heat exchanger 70 such as an oil warmer is disposed, and the third outlet port 20 may be connected to a channel in which a heater core 80 is disposed.

A first embodiment of a flow control valve that can be applied to the present invention is described hereafter in detail with the accompanying drawings.

Referring to FIGS. 2A to 8, a flow control valve according to the present invention includes a valve housing 10 having a space 14 for receiving a coolant from an engine, a driving unit 11 mounted on the valve housing 10, a valve disposed in the valve housing 10 and being able to rotate within a predetermined range of angle therein, and a port distributor 13 coupled to the outer side of the valve housing 10.

A first inlet hole 16 is formed through the center portion of a lower cover 15 coupled to the bottom of the valve housing 10 so that an engine coolant from the engine can flow into the space 14 of the valve housing 10, that is, a coolant discharged from the cylinder head of an engine can always flow into a space 14.

A second inlet hole 17 is formed through the lower cover 15 at a predetermined position spaced from the first inlet hole 16 so that the coolant discharged from the cylinder block of the engine can flow into the space 14 through the inlet port 21.

The first outlet port, second outlet port, and third outlet port for supplying engine coolant to a radiator, an oil heat exchanger (or an oil cooler) or an EGR cooler, and a heater core and the inlet port 21 allowing the coolant discharged from the cylinder block to flow into the space protrude from the valve housing 10 to communicate with the space 14. Though not shown in the figures, a transmission port for supplying the engine coolant to a transmission may be further installed to communicate with the space.

The driving unit 11 (for example, a motor) for rotating the valve 12 by a rotary shaft 39 within a predetermined range of angle is mounted on the valve housing 10.

The valve 12 for selectively supplying the engine coolant in the space 14 to the radiator, the oil heat exchanger, and the heater core through corresponding ports can be rotated within a predetermined range of angle in the valve housing 10 by the driving unit 11 and the rotary shaft 39.

A first distribution hole 22 and a second distribution hole 23 that communicate with each other are formed through the lower portion of the side of the valve 12 to supply the coolant in the space 14 to the heater core and the oil heat exchanger and share the second outlet port 19 of the valve housing 10.

Though not shown in the figures, the valve 12 may be formed in types having a convex side, such as a bowl type, a cylinder type, and an elliptical type.

A third distribution hole 24 that communicates with the first outlet port 18 of the valve housing 10 is formed through the upper portion of the side of the valve 12.

Any one of the first and second distribution holes 22 and 23 is formed aligned with the third distribution hole 24 along a direction parallel to the rotary shaft 39 and the other one is formed misaligned from the third distribution hole 24 on the side of the valve 12.

The first and second distribution holes 22 and 23 communicate with each other through a connection passage slit 25 smaller than them.

The port distributor 13 coupled to the outer side of the valve housing 10 has the third outlet port 20 having an inlet that communicates with the third distribution hole 24 and the second outlet port 19 having an inlet that communicates with the first distribution hole 22 or the second distribution hole 23 and connected to the third outlet port 20 through a connection passage pipe 27.

A check valve 26 that allows the coolant flowing to the second outlet port 19 from the first distribution hole 22 or the second distribution hole 23 to turn to the third outlet port 20 is disposed in the port distributor 13 (that is, the coolant can flow from the second outlet port 19 to the third outlet port 20, but cannot flow from the third outlet port 20 to the second outlet port 19).

In order to couple the check valve 26, a body 26a of the check valve 26 is inserted into a coupling hole 29 of the port distributor 13 and then a stopper 28 is fitted into a slit 30 formed around the coupling hole 29 to be locked in a locking groove 31 on the body 26a. Accordingly, the check valve 26 cannot be separated from the port distributor 13.

The present invention may further include a first sealing member 34, a first O-ring 37, a second sealing member 35, and a second O-ring 38.

Figure 6:
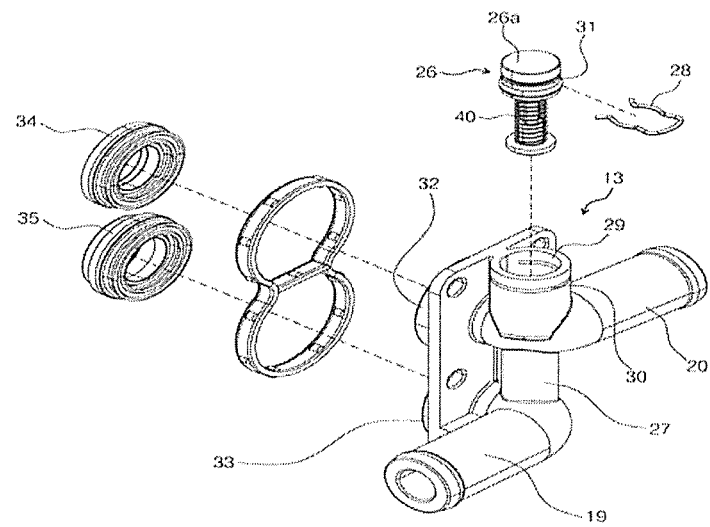
FIG. 6 is an exploded perspective view of a port distributor coupled to the valve housing shown in FIG. 2B.
Figure 7:
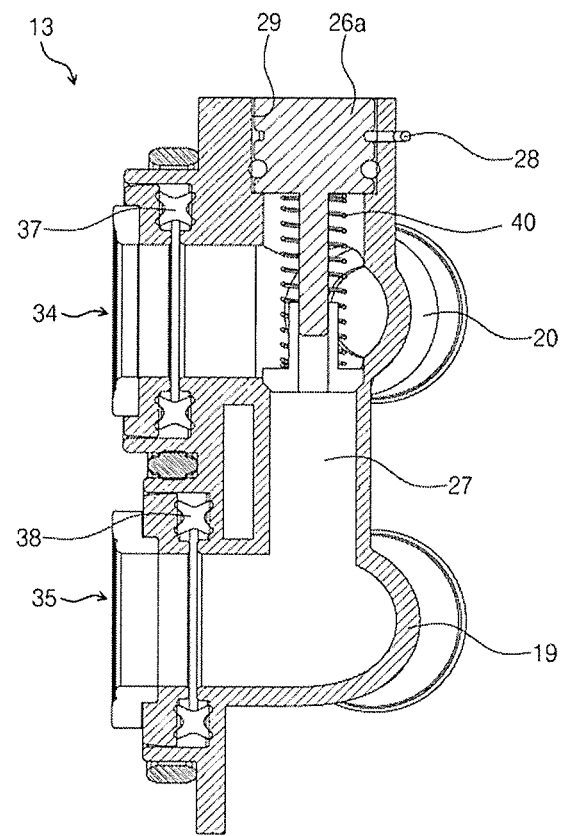
FIG. 7 is a cross-sectional view of the port distributor shown in FIG. 6.

Referring to FIGS. 6 and 7, the first sealing member 34 is fitted in a first boss 32 for connecting the third outlet port 20 to the third distribution hole 24 in order to seal the gap between the valve housing 10 and the first boss 32.

The first O-ring 37 is fitted in an inside of the first boss 32 to prevent a coolant from leaking through the gap between the first boss 32 and the first sealing member 34. Further, the second sealing member 35 is fitted in a second boss 33 for connecting the second outlet port 19 to the first distribution hole 22 or the second distribution hole 23 in order to seal the gap between the valve housing 10 and the second boss 33.

The second O-ring 38 is fitted in an inside of the second boss 33 to prevent a coolant from leaking through the gap between the second boss 33 and the second sealing member 35. When the port distributor 13 is coupled to the valve housing 10, the first and second sealing members 34 and 35 are fitted in the first and second bosses 32 and 33 of the port distributor 13 and the first and second O-rings 37 and 38 are fitted on the joints of the port distributor and the first and second sealing members 34 and 35, whereby it is possible to prevent a coolant from leaking through the gap between the contact surfaces of the valve housing 10 and the port distributor 13.

Reference numeral '28' indicates the stopper that is fitted in the slit 30 of the coupling hole 29, in which the body 26a of the check valve 26 is inserted, and locked in the locking groove 31 on the outer side of the body 26a to prevent the check valve 26 from being separated from the port distributor 13. Further, reference numeral '40' not stated above indicates an elastic member (for example, a compression coil spring) that elastically returns the check valve blocking the connection passage pipe 27 into the original state by pressing the valve seat of the check valve 26.

According to this configuration, the coolant from the cylinder head of an engine flows into the space 14 through the first inlet hole 16 formed through the bottom of the valve housing 10 and the coolant from the cylinder block of the engine flows into the space 14 through the second inlet hole 17 formed though the bottom of the valve housing 10 and the inlet port 21.

When the driving unit 11 is operated, the valve 12 in the valve housing 10 is rotated at a predetermined angle by the rotary shaft 39 connected to the driving unit 11, so the engine coolant that has moved in the space 14 from the engine can be selectively supplied to the radiator, the oil heat exchanger, and the heater core through the first outlet port 18, the second output port 19, and the third outlet port 20.

When the driving unit 11 is operated and the valve 12 is rotated at a predetermined angle (for example, within the range of 0~270°) by the rotary shaft 39, the first distribution hole 22 or the second distribution hole 23 formed through the lower portion of the side of the valve 12 and communicating with each other through the connection passage slit 25 is connected to the second outlet port 19, so the coolant in the space 14 of the valve housing 10 can be supplied to the second outlet port 19.

When the driving unit 11 is operated and the valve 12 is rotated at a predetermined angle by the rotary shaft 39, the third distribution hole 24 formed through the lower portion of the side of the valve 12 is selectively connected to the third outlet port 20 or the first outlet port 18, so the coolant in the space 14 can be supplied to the third outlet port 20 (for example, which is fully opened beyond an opening angle of about 240° of the valve 12) or the first outlet port 18 (for example, which 12 is fully opened within a predetermined range of angle in which the opening angle is at the middle of the entire angle).

When the second outlet port 19 starts to be closed (the amount of the coolant supplied to the oil heat exchanger decreases) with the third outlet port 20 maintained fully open (the amount of the coolant supplied to the heater core increases) by rotation of the valve 12 (in which the first outlet port 18 has been closed), the coolant in the space 14 of the valve housing 10 can be supplied to the third outlet port 20 or the second outlet port 19 through the first distribution hole 22 or the second distribution hole 23 at the lower portion of the valve 12.

For example, when the valve 12 is rotated beyond an opening angle of about 240°, the third distribution hole 24 at the upper portion of the valve 12 is closed, so the third outlet port 20 cannot be fully opened. In this case, some of the coolant in the space 14 of the valve housing 10 can be supplied to the third outlet port 20 by the port distributor 13 coupled to the valve housing 10.

In detail, when the second outlet port 19 communicates with the first distribution hole 22 or the second distribution hole 23 at the lower portion of the valve 12, the coolant in the space 14 of the valve housing 10 can move to the second outlet port 19 through the first distribution hole 22 or the second distribution hole 23 and some of the coolant that has moved in the second outlet port 19 can move to the third outlet port 20 through the connection passage 27 of the port distributor 13.

The coolant that has moved to the port distributor 13 through the first distribution hole 22 or the second distribution hole 23 from the space 14 can move only from the second outlet port 19 to the third outlet port 20 by the check valve 26.

FIGS. 19 to 23 show the configuration of a second embodiment of the flow control valve according to the present invention.

Figure 19:
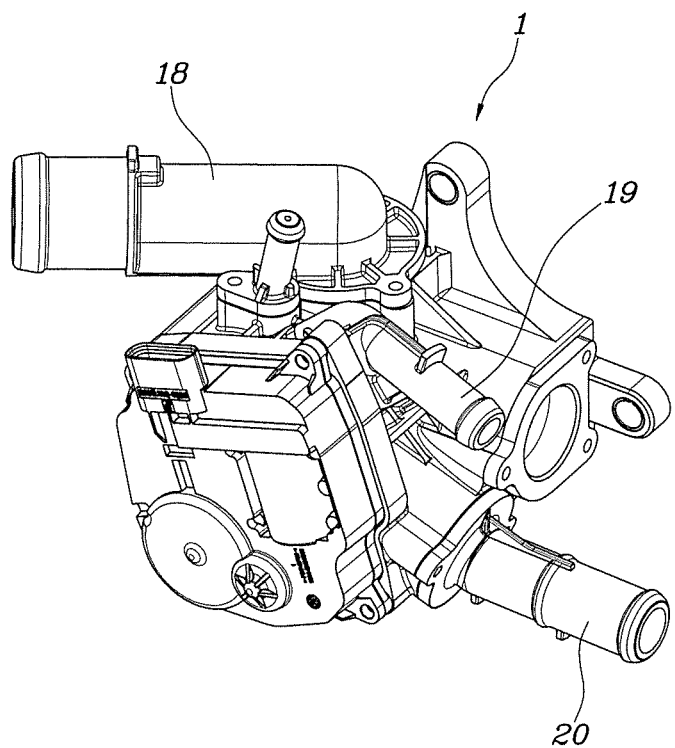
FIG. 19 is a view showing the external shape according to a second embodiment of the flow control valve of the present invention.
Figure 20:
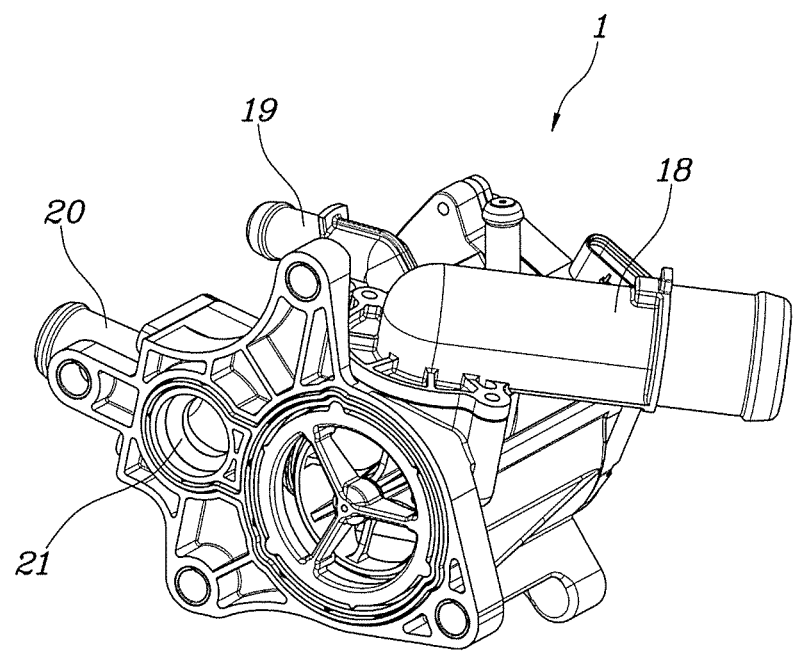
FIG. 20 is a view showing the part into which a coolant flows from a cylinder head and a cylinder block according to the second embodiment of the flow control valve of the present invention.

FIG. 19 is a view showing the external shape according to a second embodiment of the flow control valve of the present invention and FIG. 20 is a view showing the part into which a coolant flows from a cylinder head and a cylinder block according to the second embodiment of the flow control valve of the present invention.

Figure 21:
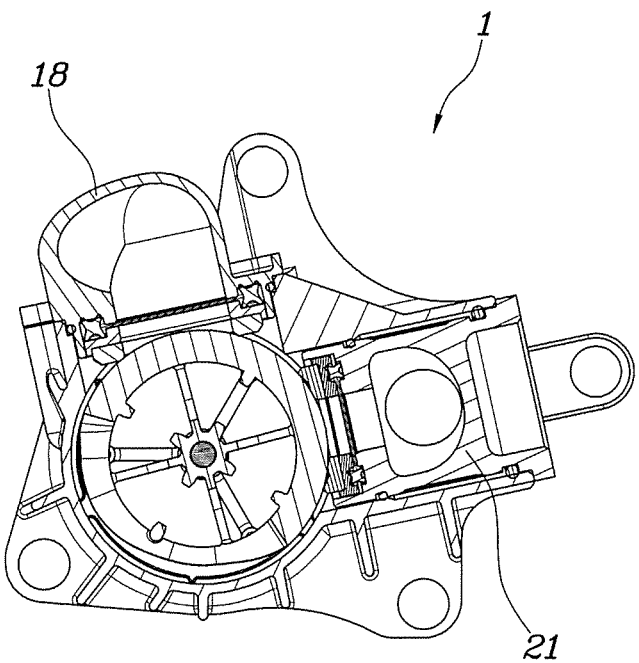
FIG. 21 is a cut view showing ports connected to the inside of a flow control valve, a cylinder block, and a radiator according to the second embodiment of the flow control valve of the present invention.
Figure 22:
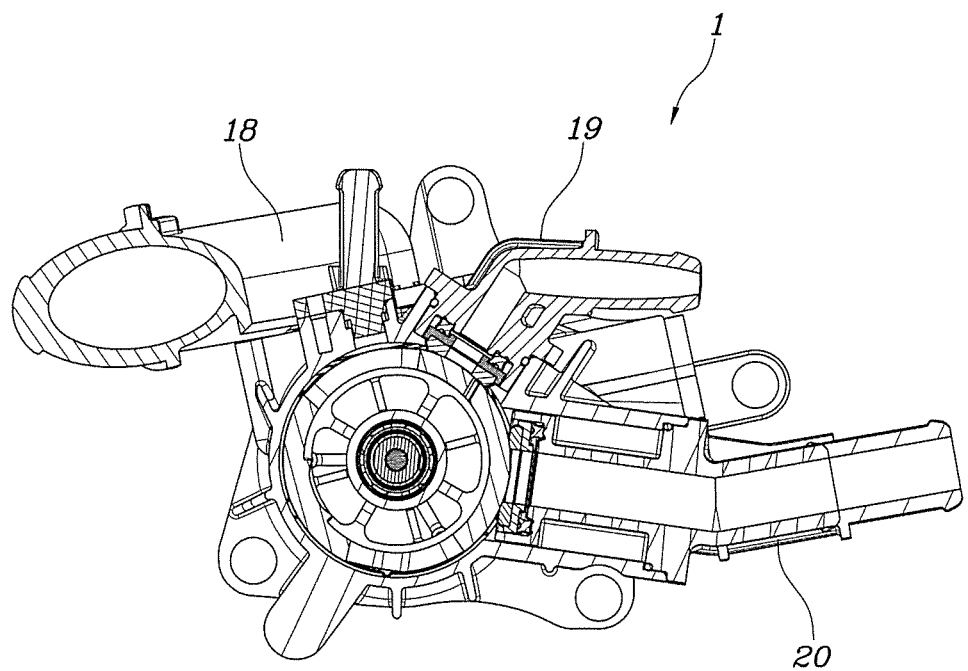
FIG. 22 is a cut view showing ports connected to the inside of a flow control valve, an oil heat exchanger, and a heater core according to the second embodiment of the flow control valve of the present invention.

FIG. 21 is a cut view showing the inside of a flow control valve and its ports connected to a cylinder block and a radiator according to the second embodiment of the flow control valve of the present invention and FIG. 22 is a cut view showing the inside of a flow control valve and ports connected to an oil heat exchanger and a heater core according to the second embodiment of the flow control valve of the present invention.

Figure 23:
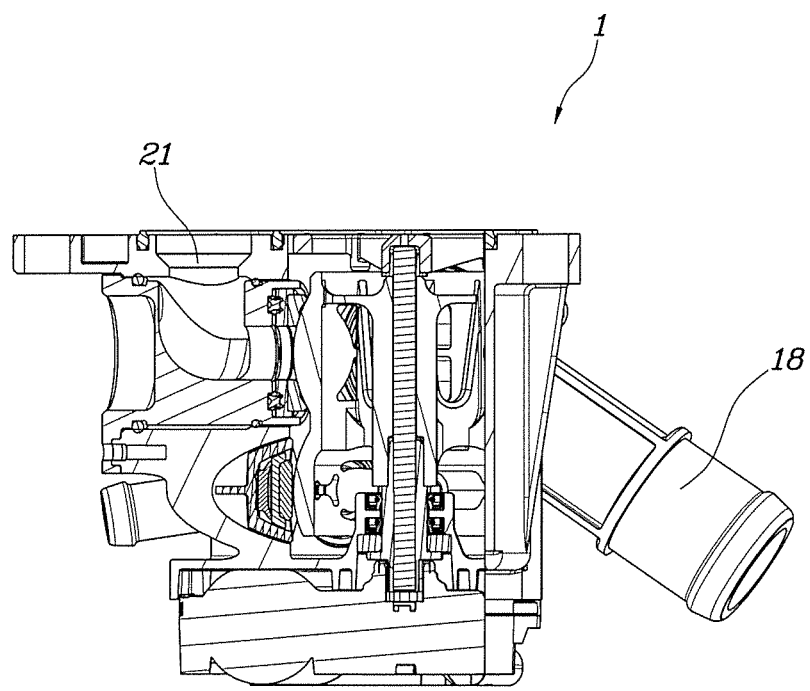
FIG. 23 is a view showing the coupling relationship of the inside of the flow control valve, a valve, and a driving unit according to the second embodiment of the flow control valve of the present invention.

Further, FIG. 23 is a view showing the inside of the flow control valve and the coupling relationship of a valve and a driving unit according to the second embodiment.

That is, not only the flow control valve shown in FIGS. 2 to 7, but the flow control valve shown in FIGS. 19 to 23 can be applied to the present invention.

According to the flow control valve 1 of the present invention, the valve 12 can be rotated by the driving unit 11 and the opening rates of the outlet ports and the inlet port 21 can be determined in accordance with an operation angle.

Figure 8:
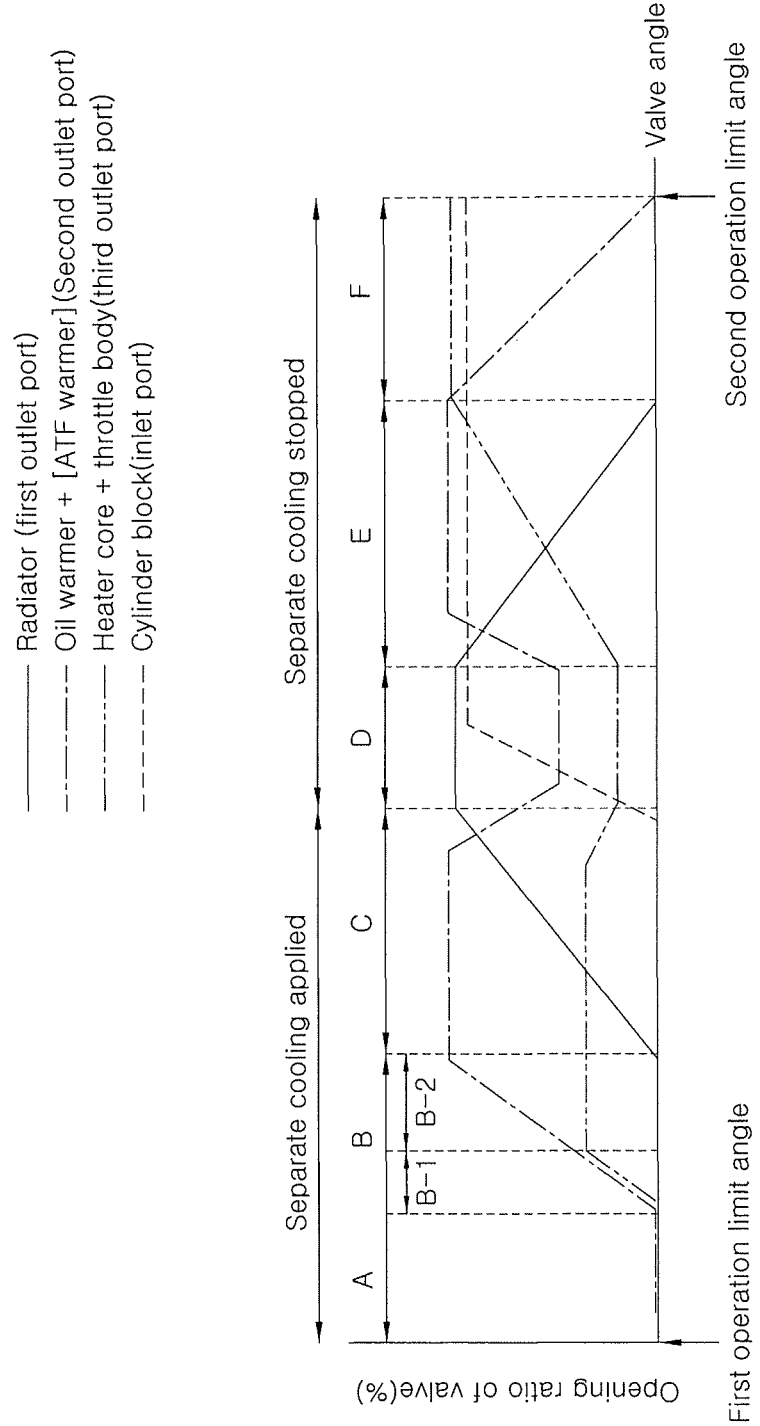
FIG. 8 is a view showing an opening rate view of the flow control valve according to the present invention.

FIG. 8 is an opening rate diagram of the flow control valve 1 according to the present invention and changes in opening rate of ports according to changes in operation angle of the valve are described hereafter. First, in the opening rate diagram, horizontal-axis is the entire rotational angle of a valve (the section between the left and the right end) and vertical-axis is the opening rate of a port.

The entire rotational angle of the flow control valve 1 can be determined within a predetermined range. As the operation angle of the valve is changed within the entire rotational angle, depending on the operation state of a vehicle, the amounts of opening of the first outlet port 18, the second outlet port 19, the third outlet port 20, and the inlet port 21 are changed.

In particular, the opening rate of the first outlet port 18 may be set to be symmetrically changed in a first direction and a second direction from a mid-operation angle (135° when the entire operation angle is 270°) of the entire operation angle (a predetermined angle of 0~270°) of the flow control valve 1.

That is, it can be seen that the middle point on horizontal-axis may be the mid-operation angle of the flow control valve 1 in the opening rate diagram of FIG. 8. The changing of the opening rate of the first outlet port 18 when the flow control valve 1 is rotated clockwise and counterclockwise with respect to the mid-operation angle makes a symmetric structure.

In detail, the opening rate of the first outlet port 18 may be set to be the maximum in the maximum cooling section D including the mid-operation angle of the flow control valve 1.

Further, the opening rate of the first outlet port 18 may be set to gradually decrease as the flow control valve 1 is operated in the first direction or the second direction from the maximum cooling section D including the mid-operation angle of the flow control valve 1.

That is, in the maximum cooling section that is the middle section of the entire operation angle of the flow control valve 1, the first outlet port 18 is fully opened and the opening rates of the second outlet port 19 and the third outlet port 20 to be described below are decreased, so the flow rate to the first outlet port 18 is increased and thus the heating performance of the radiator 60 is maximized.

When the valve is operated clockwise or counterclockwise by operation of the flow control valve 1 and the operation angle of the flow control valve 1 starts to come out of the maximum cooling section D, the opening amount of the first outlet port 18 gradually decreases, in the opening amounts of the first outlet port 18 by clockwise rotation and counterclockwise rotation decrease at the same rate.

Further, the opening rate of the first outlet port 18 may be set to become the minimum before the operation angle of the flow control valve 1 reaches a first end and a second end from the maximum cooling section D of the flow control valve 1.

That is, as the flow control valve 1 is operated, the operation angle of the flow control valve 1 comes out of the maximum cooling section D, and the first outlet port 18 gradually decreases in opening amount, and fully closes, so the first outlet port 18 can be fully closed before the flow control valve 1 is operated clockwise or counterclockwise and reaches both ends.

For example, referring to FIG. 8, when the operation angle of the flow control valve 1 enters a warming-up section B from a first variable operation section C, the first outlet port 18 fully closes, and when it enters a heating priority operation section F from a second variable operation section E, the first outlet port 18 can fully close.

Meanwhile, the opening rate of the inlet port 21 may be set to become the minimum in the first direction and maximum in the second direction from the mid-operation angle of the flow control valve 1.

For example, the inlet port 21, which is a passage through which the coolant discharged from the coolant outlet of the cylinder block 50a flows into the flow control valve, fully closes when the operation angle of the flow control valve enters to the first variable operation section C from the mid-operation angle, and in contrast, it fully opens when the operation angle of the flow control valve moves to the second variable operation section E from the mid-operation angle.

That is, the technology of separately cooling the cylinder head 50b and the cylinder block 50a can be performed or not, by using the opening or closing of the inlet port 21 according to the operation of the flow control valve 1, and 4-port control that simultaneously controls three outlet ports and one inlet port 21 by operating only the flow control valve 1 is possible.

Accordingly, fuel efficiency can be improved by performing of the separate cooling technology and there is no need for an additional ports control configuration for the separate cooling, so the manufacturing costs are saved.

On the other hand, the outlet ports of the present invention may include a second outlet port 19 connected to the oil heat exchanger or the EGR cooler 70 and a third outlet port 20 connected to the heater core 80.

The opening rates of the second outlet port 19 and the third outlet port 20 may be set such that the second outlet port 19 and the third outlet port 20 are partially opened in the maximum cooling section D.

That is, when it is required to maximally cool the engine 50, the coolant flow rate to the radiator 60 is maximized by fully opening the first outlet port 18, in which the flow control valve 1 is operated such that only a necessary limited amount of coolant is supplied to the oil heat exchanger or the EGR cooler 70 and the heater core 80.

Further, in a flow stop section A including a first operation limit angle at the first end of the entire operation angle of the flow control valve 1, the opening rates of all of the first outlet port 18, the second outlet port 19, the third outlet port 20, and the inlet port 21 may be set to be the minimum.

The first operation limit angle may correspond to the left end in FIG. 8 and the flow stop section A may be the first section from the left end.

For example, when the engine 50 is started in a cold condition, the entire engine can be quickly warmed up by closing all of the ports so that the flow of coolant is stopped and a loss of heat energy to the outside is prevented, which contributes to improving fuel efficiency and reducing emission of an engine.

Further, in the warming-up section B between the mid-operation angle and the flow stop section A, the opening rates of the first outlet port 18 and the inlet port 21 may be set to be the minimum and the opening rate of the second outlet port 19 may be set to be variable between the minimum and the maximum, depending on the operation angle change of the flow control valve 1.

For example, the opening rate of the second outlet port 19 may be set to gradually increase, as the flow control valve 1 is operated toward the mid-operation angle from the first operation limit angle.

That is, the second outlet port 19 starts to open at the point of time when the operation angle of the flow control valve 1 enters the warming-up section B from the flow stop section A and then the opening rate of the second outlet port 19 linearly increases in the warming-up section B. Further, the second outlet port 19 fully opens at the point of time when the operation angle of the flow control valve 1 enters the first variable operation section C from the warming-up section B.

Further, the opening rate of the third outlet port 20 may be set to vary, depending on the operation angle change of the flow control valve 1.

For example, the opening rate of the third outlet port 20 may be set to be gradually increased and then maintained at a predetermined level smaller than the maximum opening rate, as the flow control valve 1 is operated to the mid-operation angle from the first operation limit angle.

That is, the third outlet port 20 starts to open at the point of time when the operation angle of the flow control valve 1 enters the warming-up section B from the flow stop section A and linearly increases in the warming-up section B, but it is not fully opened and is maintained at a predetermined opening rate.

That is, in the warming-up section B, the flow rate of the coolant to the oil heat exchanger or the EGR cooler 70 and the heater core 80 is variably controlled and warming-up is quickly performed with separation cooling being performed by closing the first outlet port 18 for the radiator 60 and the inlet port 21, so the temperature of the coolant is controlled to reach a target temperature.

Further, in the first variable operation section C between the warming-up section B and the maximum cooling section D, the opening rate of the first outlet port 18 may be set to vary between the minimum and the maximum, depending on the operation angle change of the flow control valve 1.

For example, the opening rate of the first outlet port may be set to be gradually increased, as the flow control valve 1 is operated toward the mid-operation angle from the first operation limit angle.

That is, the first outlet port 18 starts to open at the point of time when the operation angle of the flow control valve 1 enters the first variable operation section C from the warming-up section B and then the opening rate of the first outlet port 18 linearly increases in the warming-up section B. Further, the first outlet port 18 fully opens at the point of time when the operation angle of the flow control valve 1 enters the maximum cooling section D from the first variable operation section C.

Further, in the first variable operation section C, the opening rate of the second outlet port 19 may be set to be the maximum, the opening rate of the third outlet port may be set such that the third outlet port 20 is partially open, and the opening rate of the inlet port 21 may be set to be the minimum.

That is, in the first variable operation section C, the second outlet port 19 for the oil heat exchanger (oil warmer) or the EGR cooler 70 is fully open with separation cooling being performed by closing the inlet port 21 and the temperature of the coolant is controlled by variably controlling the opening amount of the first outlet port 18 for the radiator 60 with the third outlet port 20 for the heater core 80 partially open.

On the other hand, in the heating priority operation section F including a second operation limit angle at the second end of the entire operation angle of the flow control valve 1 of the present invention, the opening rate of the third outlet port 20 may be set to be the maximum.

The second operation limit angle may correspond to the right end in FIG. 8 and the heating priority operation section F may be the first section from the right end.

For example, in the heating priority operation section F, the opening rate of the first outlet port 18 may be set to the minimum and the opening rate of the second outlet port 19 may be set to vary between the minimum and the maximum, depending on the operation angle change of the flow control valve 1.

That is, the opening rate of the second outlet port 19 is set to gradually increase, as the flow control valve 1 is operated from the second operation limit angle toward the mid-operation angle. The second outlet port 19 starts to open at the second operation limit angle and gradually opens more in the heating priority operation section F, and fully opens at the point of time when the operation angle of the flow control valve 1 enters the second variable operation section E from the heating priority operation section F.

Further, in the heating priority operation section F, the opening rate of the inlet port 21 may be set to be the maximum, so the inlet port 21 is fully open and the separation cooling can be ended.

That is, in the heating priority operation section F, heating is performed in priority by input from a driver and the heating for the passenger compartment is maximized by fully opening the second outlet port 19 for the heater core.

Further, in the second variable operation section E between the heating priority operation section F and the maximum cooling section D, the opening rate of the first outlet port 18 may be set to vary between the minimum and the maximum, depending on the operation angle change of the flow control valve 1.

For example, the opening rate of the first outlet port may be set to be gradually increased, as the flow control valve 1 is operated toward the mid-operation angle from the first operation limit angle.

That is, the first outlet port 18 starts to open at the point of time when the operation angle of the flow control valve 1 enters second variable operation section E from the heating priority operation section F and then the opening rate of the first outlet port 18 linearly increases in the second variable operation section E. Further, the first outlet port 18 fully opens at the point of time when the operation angle of the flow control valve 1 enters the maximum cooling section D from the second variable operation section E.

Further, in the second variable operation section E, the opening rate of the second outlet port 19 may be set to vary, depending on the operation angle change of the flow control valve 1.

For example, the opening rate of the second outlet port 19 may be set to maintain the maximum level and then gradually decrease not smaller than the minimum opening rate, as the flow control valve 1 is operated toward the mid-operation angle from the second operation limit angle.

That is, the second outlet port 19 is fully open at the point of time when the operation angle of the flow control valve 1 enters the second variable operation section E from the heating priority operation section F and the opening rate linearly decreases before the operation angle of the flow control valve enters the maximum cooling section D, but the second outlet port is not fully closed and is maintained at a predetermined opening rate.

Further, in the second variable operation section E, the opening rate of the third outlet port 20 may be set to vary, depending on the operation angle change of the flow control valve 1.

For example, the opening rate of the second outlet port 20 may be set to gradually decrease not smaller than the minimum opening rate, as the flow control valve 1 is operated toward the mid-operation angle from the second operation limit angle.

That is, the second outlet port 20 starts to gradually decrease at the point of time when the operation angle of the flow control valve 1 enters the second variable operation section E from the heating priority operation section F and the opening rate linearly decreases in the second variable operation section E, but the second outlet port is not fully closed and maintained at a predetermined opening rate.

Further, in the second variable operation section E, the opening rate of the inlet port 21 may be set to be the maximum, so the inlet port 21 is fully open and the separation cooling can be ended.

That is, in the second variable operation section E, the separation cooling is stopped and the temperature of the coolant is controlled to decrease when the engine coolant temperature is high, as in a high-speed and high-load operation range of an engine.

Figure 9:
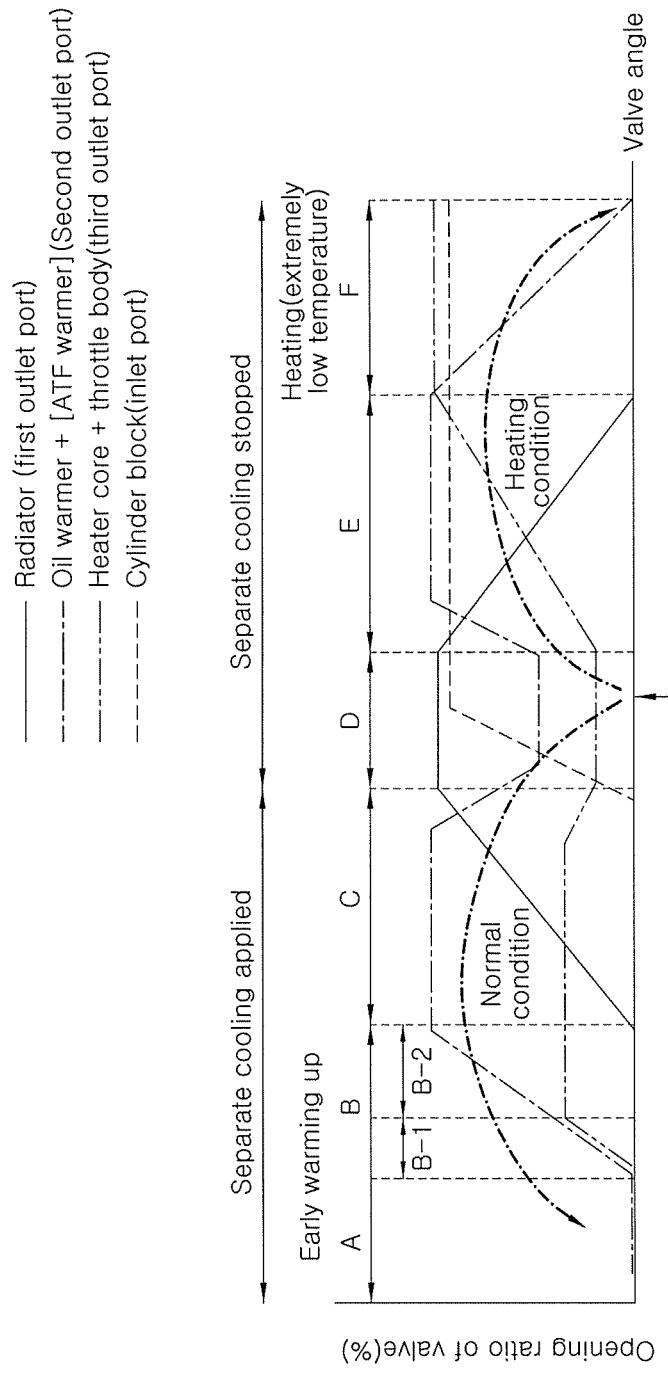
FIG. 9 is a view illustrating the operation of the flow control valve when an engine is started on the basis of the opening rate view shown in FIG. 8.
Figure 10:
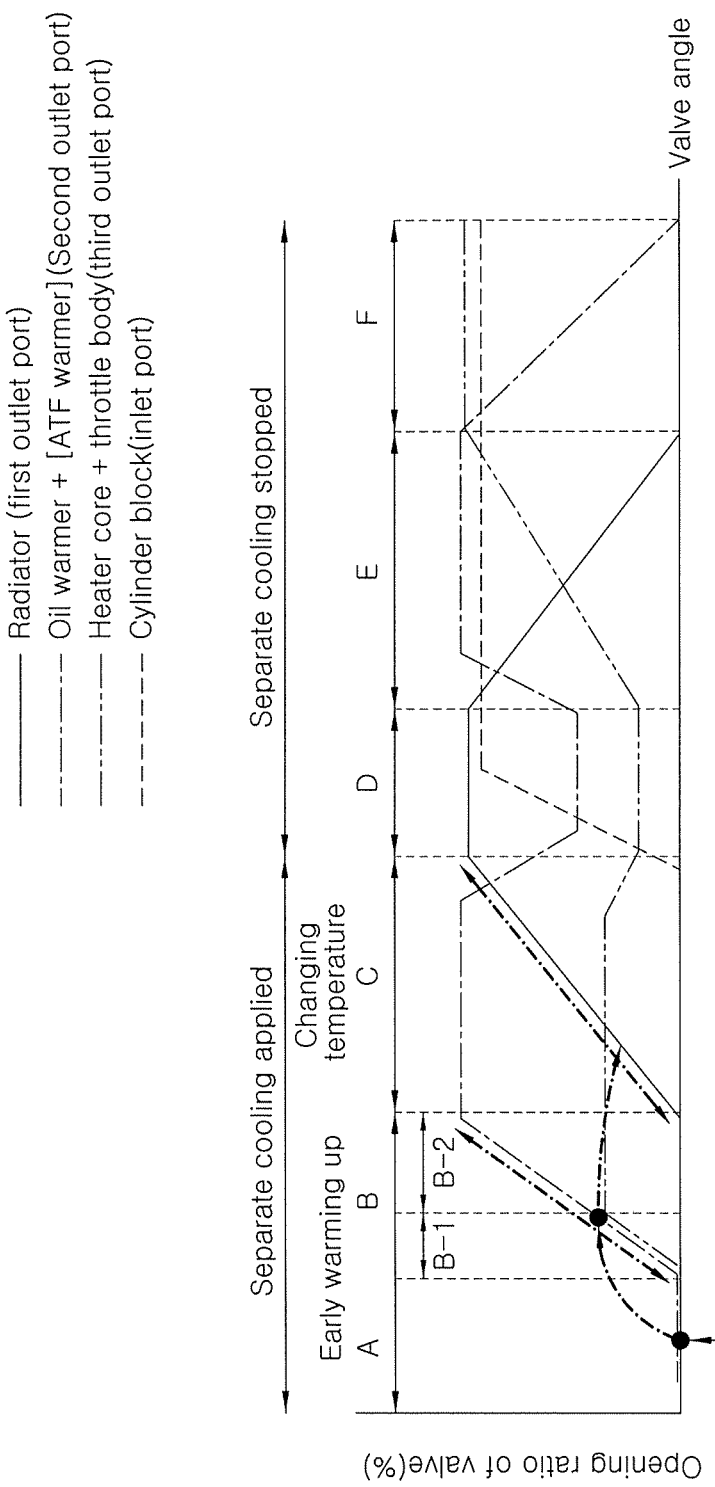
FIG. 10 is a view illustrating the operation of the flow control valve when a normal driving mode is entered after an engine is started on the basis of the opening rate view shown in FIG. 8.
Figure 11:
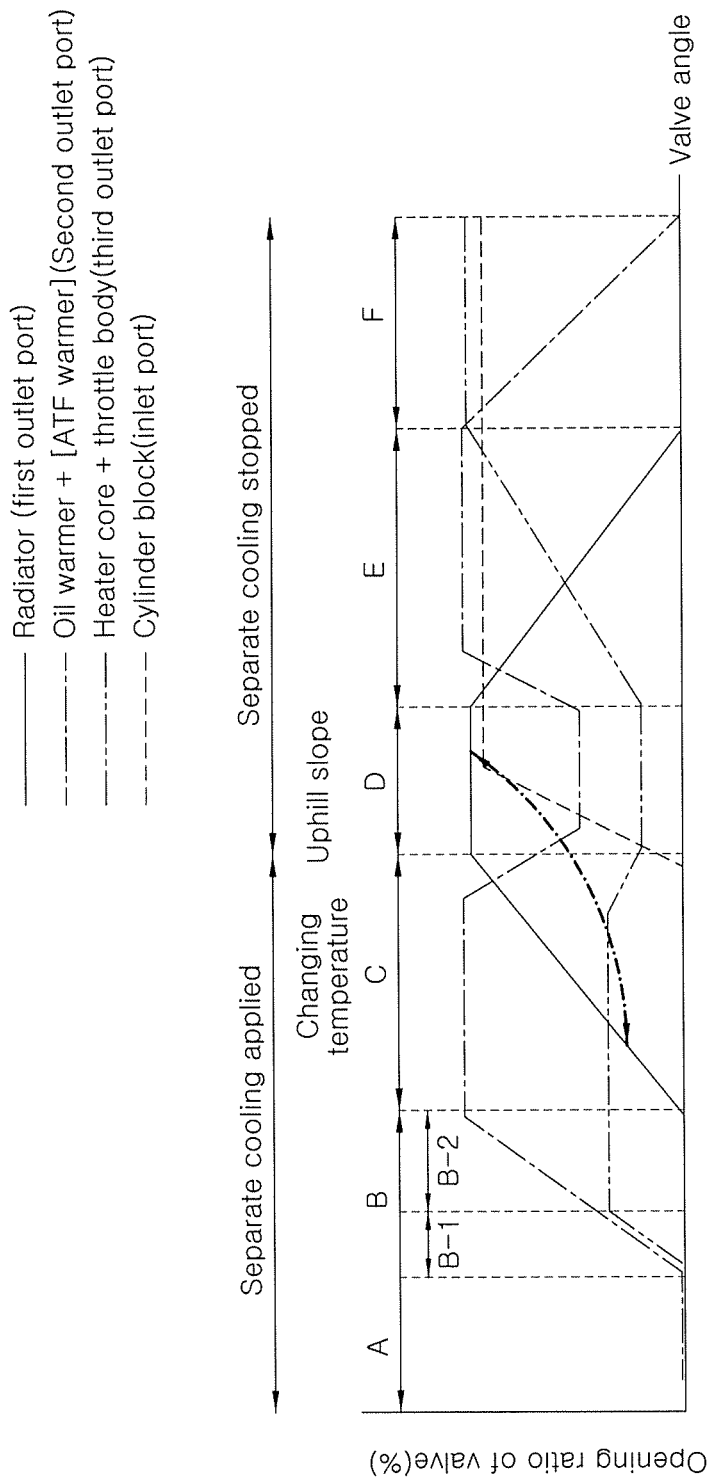
FIG. 11 is a view illustrating the operation of the flow control valve in a maximum cooling period on the basis of the opening rate view shown in FIG. 8.
Figure 12:
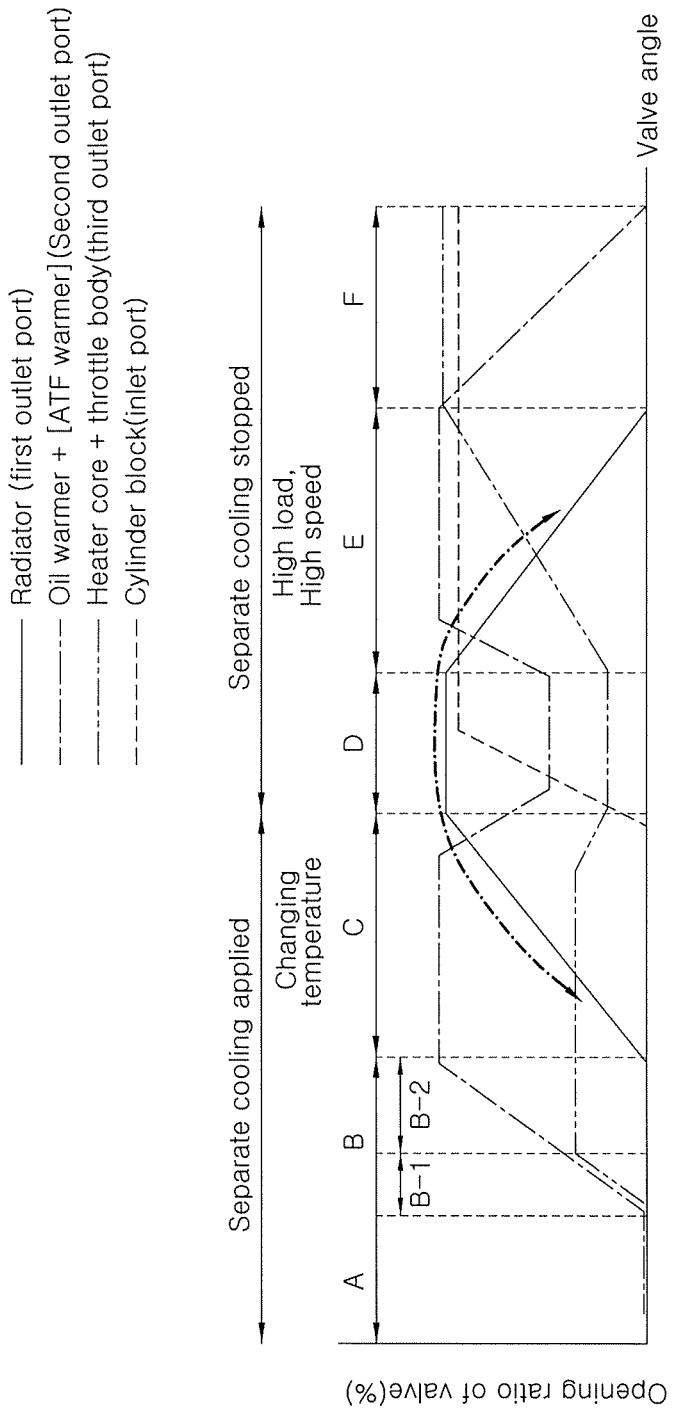
FIG. 12 is a view illustrating the operation of the flow control valve in a first variable operation period and a second variable operation period on the basis of the opening rate view shown in FIG. 8.
Figure 14:
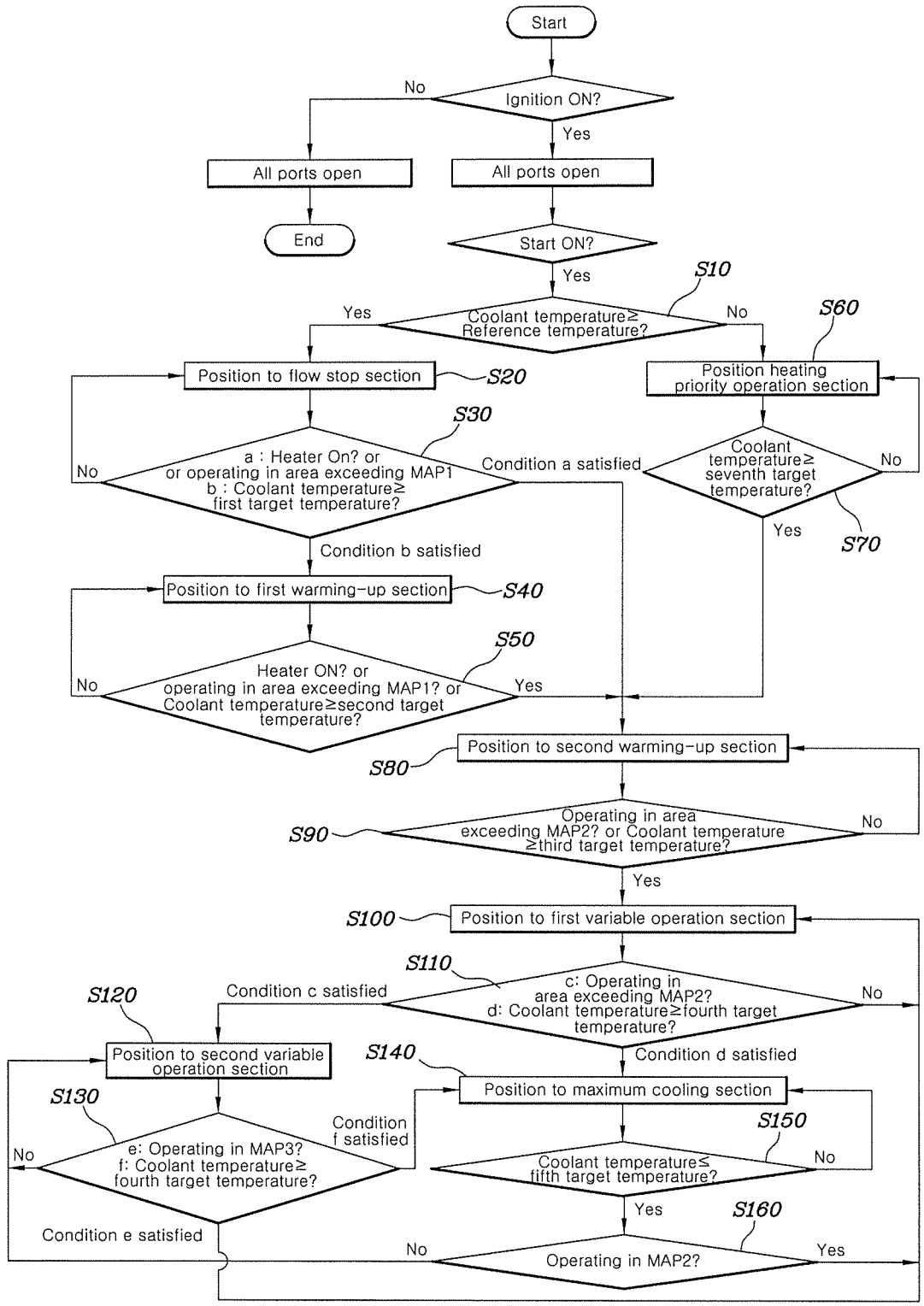
FIG. 14 is a view illustrating the control flow of the flow control valve according to the present invention.
Figure 15:
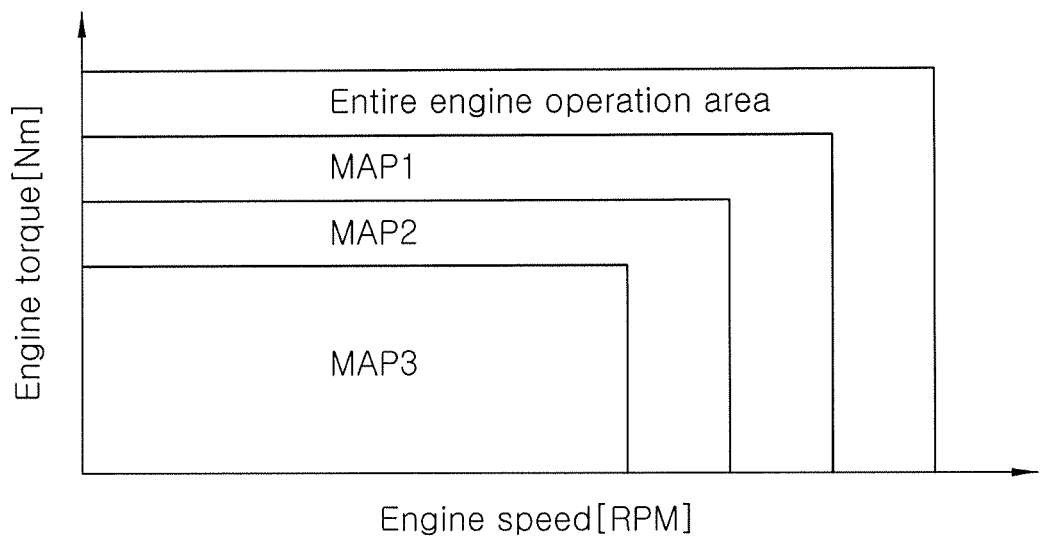
FIG. 15 is a view comparing first, second, and third engine operation maps according to the present invention.
Figure 16:
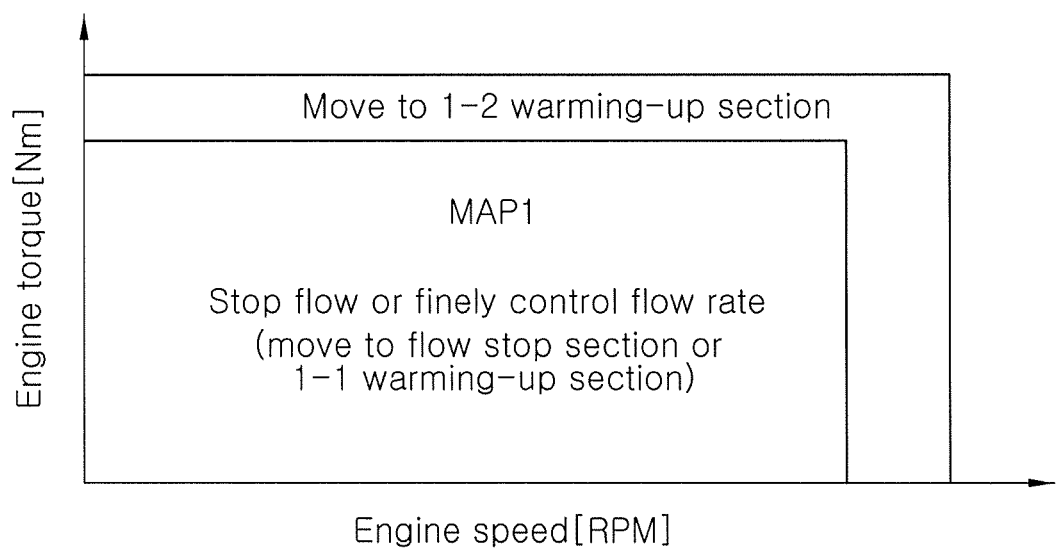
FIG. 16 is a view exemplifying a first engine operation map that is the basis of moving to a 1-2 warming-up section from a flow stop section or a 1-1 warming-up section according to the present invention.
Figure 17:
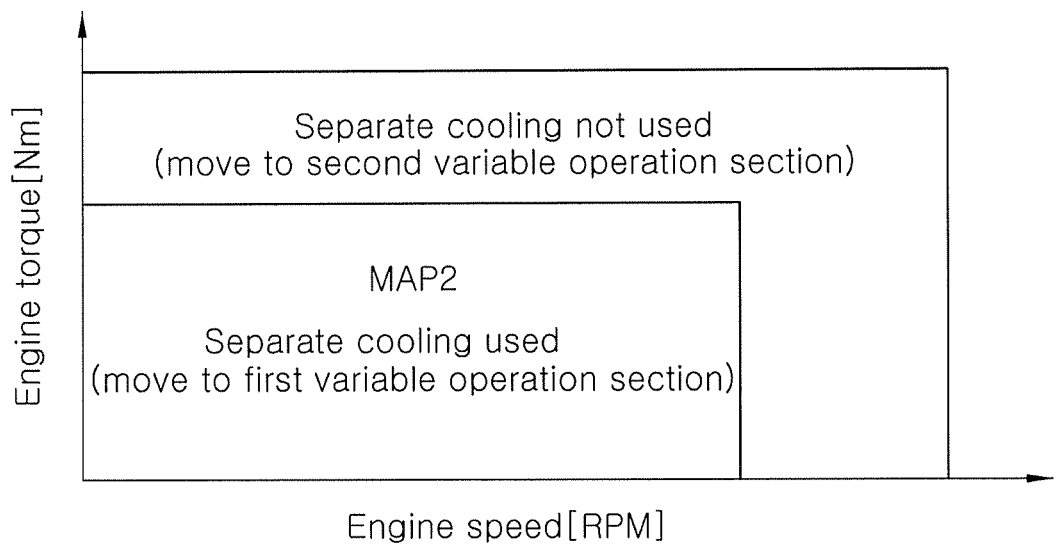
FIG. 17 is a view exemplifying a second engine operation map that is the basis of moving from the first variable operation section to the second variable operation section according to the present invention.

On the other hand, as shown in FIGS. 1, 9, and 14, a vehicle can be controlled to operate in a normal driving mode or a heating priority mode on the basis of conditions such as external air temperature when the engine 50 is started, the initial engine coolant temperature, and the conditions for using a heater.

For example, the present invention may further include a controller 90 that enters the normal driving mode and positions the flow control valve 1 to the flow stop section A, if the coolant temperature is a reference temperature or higher when the engine is started.

The controller 90 can enter the heating priority mode and position the flow control valve 1 to the heating priority operation section F if the coolant temperature is lower than the reference temperature when the engine is started.

That is, the controller can select the normal driving mode that prioritizes the fuel efficiency and the heating priority mode that prioritizes heating in consideration of the initial temperature of the engine coolant.

However, the controller 90 can position the flow control valve 1 to a section in which all of the ports of the flow control valve 1 are open, for example, the maximum cooling section D, when the engine is in from a stop state to an ignition-on state before starting.

That is, when the engine is not working such as the stop state or the ignition-on state before starting, the operation angle of the flow control valve 1 is in the maximum cooling section D, and then the operation angle of the flow control valve 1 can be sequentially moved to the flow stop section A or the heating priority section F, depending on the normal driving mode or the heating priority mode determined when the engine is started.

Further, even if a signal showing a malfunction of the flow control valve 1 is input, the flow control valve 1 can be positioned to the section in which all the ports of the flow control valve 1 are at least partially open.

Further, referring to FIGS. 1, 10, and 14 to 16, when the normal driving mode is determined, the operation angle of the flow control valve 1 enters the flow stop section A, and the coolant temperature is a first target temperature that is higher than the reference temperature, the controller 90 can position the operation angle of the flow control valve 1 to a first warming-up section B-1 bordering on the flow stop section A of the warming-up section B.

The coolant temperature can be measured by a coolant temperature sensor 52 in the cooling circuit, which may be disposed between the rear end of the cylinder head 50b and the front end of the flow control valve 1.

When the coolant temperature is equal to or higher than a second target temperature that is higher than the first target temperature, the heater is turned on, or the engine is current operated in an area exceeding a first engine operation map MAP1 that is determined from the relationship between the engine speed and the engine load, at a state that the operation angle of the flow control valve 1 is in the first warming-up section B-1, the controller can move the operation angle of the flow control valve 1 to a second warming-up section B-2 bordering on the first variable operation section C of the warming-up section B.

That is, in the normal driving mode, it is possible to quickly warm up the engine 50 and improve the fuel efficiency by stops the flow of the coolant.

When the coolant temperature reaches the first target temperature in the process of stopping the flow, the flow control valve 1 is operated such that the opening rate of the second outlet port 19 gradually increases until the coolant temperature increases up to the second target temperature, whereby it is possible to control the flow rate to the heater core 80 and the oil heat exchanger or the EGR cooler 70.

Further, when the heater is turned on or the engine is currently operated in an area exceeding the first engine operation map that is determined from the relationship between the engine speed and the engine load, at a state that the operation angle of the flow control valve 1 is in the flow stop section A, the controller can move the operation angle of the flow control valve 1 to the second warming-up section B-2 bordering on the first variable operation section C of the warming-up section B.

That is, when a driver intends to rapidly accelerate the vehicle, at a state that the operation angle of the flow control valve 1 is in the flow stop section A, it is possible to quickly move the operation angle of the flow control valve 1 to the second warming-up section B-2 through the first warming-up section B-1 regardless of the coolant temperature.

Further, when the coolant temperature is equal to or higher than a third target temperature that is higher than the second target temperature or the engine is currently operated in an area exceeding a second engine operation map MAP2 that is smaller than the first engine operation map MAP1, at a state that the operation angle of the flow control valve 1 is in the second warming-up section B-2, the controller 90 can position the operation angle of the flow control valve 1 to the first variable operation section C.

Further, referring to FIGS. 1, 11, 14, and 15, when the coolant temperature is equal to or higher than a fourth target temperature that is higher than the third target temperature, the controller 90 can position the operation angle of the flow control valve 1 to the maximum cooling section D.

Further, when the coolant temperature is equal to or lower than a fifth target temperature that is lower than the fourth target temperature and the engine is operated in the second engine operation map MAP2 in the maximum cooling section D, the controller can position the operation angle of the flow control valve 1 to the first variable operation section C.

For example, when it is required to drive the vehicle under high load such as driving on an uphill slop with a low vehicle speed and high load in the process of changing the coolant temperature in the first variable section C after the engine 50 is warmed up, the flow control valve 1 is operated to place the operation angle of the flow control valve 1 in the maximum cooling section D, in which the flow rates to the oil warmer and the heater core 80 are maintained at the minimum level and the flow rate to the radiator 60 is maximized.

Further, when the coolant temperature drops under a predetermined level and the engine is operated in an area with relatively low load as the result of checking the engine load and the engine speed, at a state of the operation angle of the flow control valve 1 is in the maximum cooling section D, the operation angle of the flow control valve 1 is moved back to the first variable section C. That is, the coolant temperature is controlled by alternate switching the operation angle of the flow control valve 1 to the maximum cooling section D or the first variable operation section D, depending on the engine operation conditions and the coolant temperature.

Further, referring to FIGS. 1, 12, 14, 15, and 17, when the engine is currently operated in an area exceeding the second engine operation map MAP2 at a state of the operation angle of the flow control valve 1 is in the first variable section C, the controller 90 can position the flow control valve 1 to place the operation angle of the flow control valve 1 in the second variable operation section E.

Figure 18:
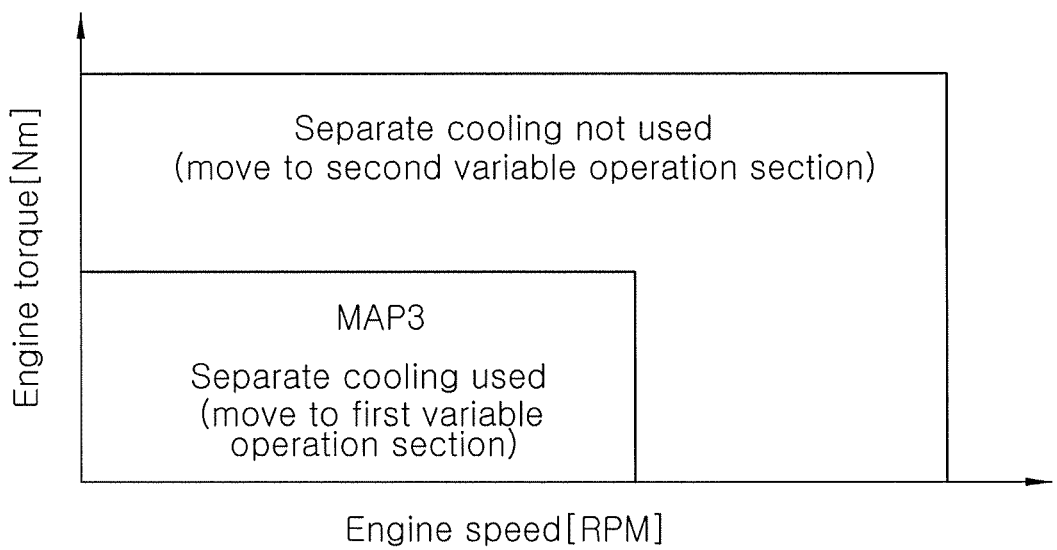
FIG. 18 is a view exemplifying a third engine operation map that is the basis of moving from the second variable operation section to the first variable operation section according to the present invention.

Further, referring to FIG. 18, when the engine is operated in a third engine operation map MAP3 that is smaller than the second engine operation map MAP2 in the second variable operation section E, the controller can position the flow control valve 1 to place the operation angle of the flow control valve 1 in the first variable operation section C.

For example, when the engine is operated under relatively high load in comparison to the second engine operation map MAP2 in the process of changing the coolant temperature at a state of the operation angle of the flow control valve 1 is in the first variable operation section C after the engine is warmed up, the operation angle of the flow control valve 1 is moved from the first variable operation section C to the second variable operation section E, and when the engine is operated under relatively low load at a state of the operation angle of the flow control valve 1 is in the second variable operation section E, the operation angle of the flow control valve 1 is moved back to the first variable operation section C.

That is, separation cooling is performed or stopped, and the coolant temperature is changed by alternate switching the operation angle of the flow control valve 1 to the first variable operation section C and the second variable operation section E by operating the flow control valve 1 in accordance with the engine operation conditions.

Further, the coolant temperature is changed by appropriately adjusting the flow rate of the coolant to the radiator 60 using a predetermined target coolant temperature map when the operation angle of the flow control valve 1 is in the first variable operation section C and the second variable operation section E.

Further, when the coolant temperature is the fourth target temperature that is higher than the third target temperature in the second variable operation section E, the controller 90 can position the flow control valve 1 to place the operation angle of the flow control valve 1 in the maximum cooling section D.

Further, when the coolant temperature is equal to or lower than the fifth target temperature that is lower than the fourth target temperature and the engine is operated an area exceeding the second engine operation map MAP2 in the maximum cooling period D, the controller can position the flow control valve 1 to place the operation angle of the flow control valve 1 in the second variable operation period E.

For example, further, when the coolant temperature drops under a predetermined level and the engine is operated in an area with relatively high load in comparison to the second engine operation map MAP2 as the result of checking the engine load and the engine speed, at a state of the operation angle of the flow control valve 1 is in the maximum cooling section D, the operation angle of the flow control valve 10 is moved back to the second variable period E. That is, the coolant temperature is changed by alternate switching the operation angle of the flow control valve 1 to the maximum cooling section D and the second variable operation section C, depending on the engine operation conditions and the coolant temperature.

Figure 13:
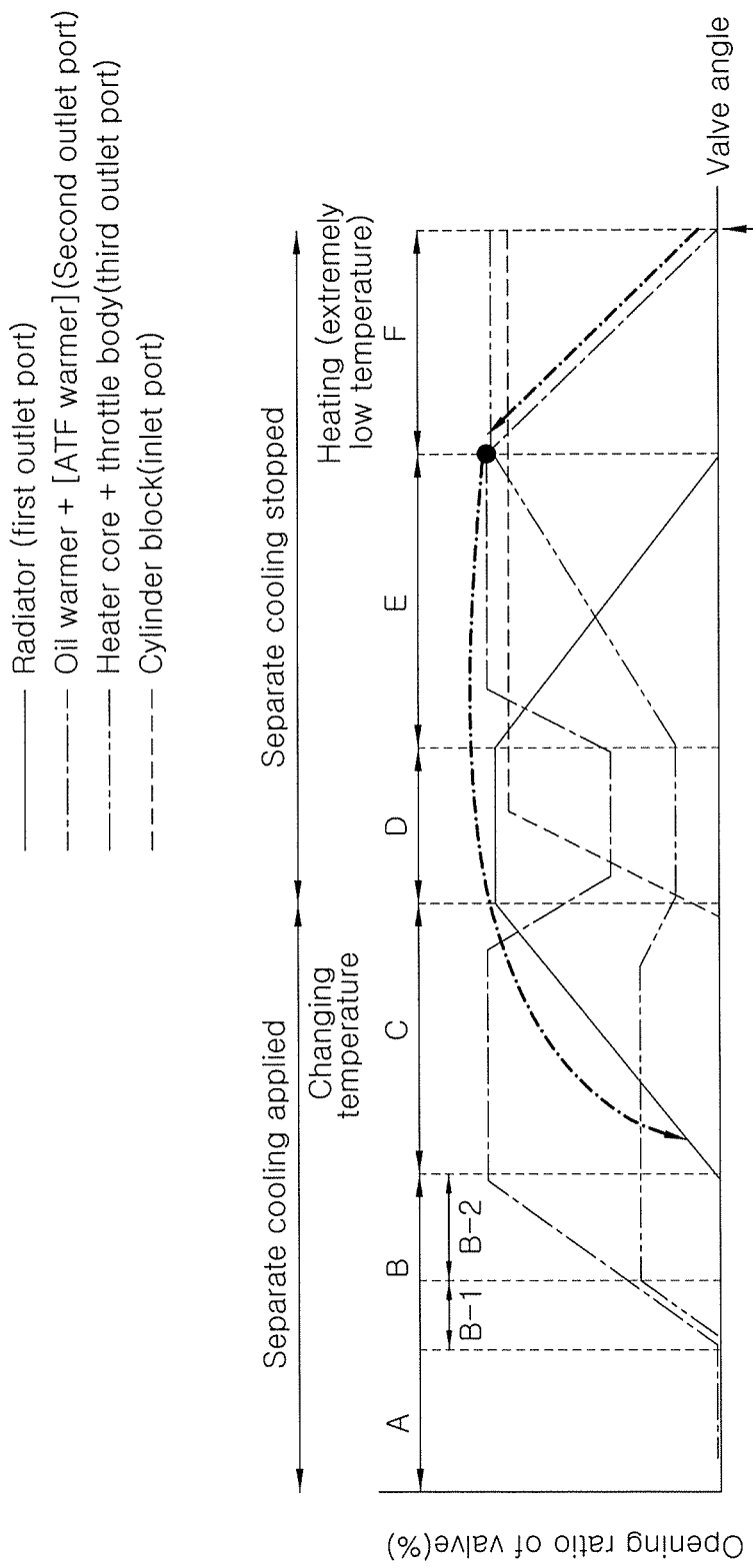
FIG. 13 is a view illustrating the operation of the flow control valve when a heating priority mode is entered after an engine is started on the basis of the opening rate view shown in FIG. 8.

Meanwhile, referring to FIGS. 1, 13, and 14, when the coolant temperature is equal to or higher than a sixth target temperature that is higher than the reference temperature in the heating priority operation section F, the controller 90 can control the flow control valve 1 such that the opening rate of the second outlet port 19 is gradually increased.

Further, when the coolant temperature is equal to or higher than a seventh target temperature that is higher than the reference temperature in the heating priority operation section F, the controller 90 can position the flow control valve 1 to place the operation angle of the flow control valve 1 in the second warming-up section B-2 bordering the first variable operation section C of the warming-up section B.

That is, in the heating priority mode, heating is preferentially performed by maximizing the flow rate of the coolant to the heater core 80, and when the coolant temperature reaches a predetermined level, the flow rate of the coolant to the oil heat exchanger or the EGR cooler 70 is gradually increased, thereby improving the fuel efficiency.

A control flow of the flow control valve 1 according to the present invention is described hereafter.

When an engine is started, the initial coolant temperature is compared with a reference temperature (S10), and when it is lower than the reference temperature, the heating priority mode is determined and the operation angle of the flow control valve 1 is entered to the heating priority operation section F, and when it is the reference temperature or higher, the normal operation mode is determined and the operation angle of the flow control valve 1 is entered to the flow stop section A. Whether the heater is used, and the engine speed and engine load (engine torque) are checked in a state that the operation angle of the flow control valve 1 is in the flow stop section A (S30). As the result of checking, when the engine is operated in the second engine operation map MAP2 and the heater is not used, the flow stop control is maintained, and when the engine is operated in an area exceeding the second engine operation map MAP2 or the heater is used, the operation angle of the flow control valve 1 is entered to the second warming-up section B-2 (S80).

Further, when the engine coolant is stopped in a state that the operation angle of the flow control valve 1 is in the flow stop section A, it is determined that the coolant temperature reaches the first target temperature by checking the coolant temperature (S30), and when it is determined that the coolant temperature has reached the first target temperature, the operation angle of the flow control valve 1 is entered to the first warming-up section B-2 and the flow rate of the engine coolant is finely controlled (S40).

Next, it is determined whether the coolant temperature increases and reaches the second target temperature, the heater is used, or the engine is operated in an area exceeding the first engine operation map MA1 in the first warming-up section B-1 (S50), and when any one of these conditions is satisfied, the operation angle of the flow control valve 1 is entered to the second warming-up section B-2 (S80).

Further, when the heating priority mode is entered under the initial starting conditions of the engine (S60), it is determined whether the coolant temperature increases and reaches the seventh target temperature (S70), and even though it has reached the seventh target temperature as the result of checking, the operation angle of the flow control valve 1 is entered to the second warming-up section B-2 (S80).

It is determined whether the coolant temperature increases and reaches the third target temperature or the engine is operated in an area exceeding the second engine operation map MAP2 in the second warming-up section B-2 (S90), and when at least one of the conditions is satisfied, the operation angle of the flow control valve 1 enters the first variable operation section C and the output temperature of the coolant is changed in accordance with the target coolant temperature map (S100).

It is determined whether the engine is operated in an area exceeding the second engine operation map MAP2 in a state that the operation angle of the flow control valve 1 is in the first variable operation section C (S110), and when the engine is operated in an area exceeding the second engine operation map MA2 as the result of checking, the operation angle of the flow control valve 1 is immediately entered to the second variable operation section and separation cooling is stopped (S120).

Further, it is determined whether the coolant temperature increases over the fourth target temperature in a state that the operation angle of the flow control valve 1 is in the first variable operation section C (S110), and when it is satisfied, the operation angle of the flow control valve enters the maximum cooling section D to reach the target coolant temperature by maximizing the cooling performance of the radiator in the vehicle (S140).

Further, it is determined whether the coolant temperature increases over the fourth target temperature even in a state that the operation angle of the flow control valve 1 is in the second variable operation section E (S130), and when it is satisfied, the operation angle of the flow control valve enters the maximum cooling section D to reach the target coolant temperature by maximizing the cooling performance of the radiator in the vehicle (S140).

In this case, the radiator is 100% open, separation cooling has been stopped, and the ports for the heater core and the oil heat exchanger or the EGR cooler minimally open, so the cooling performance of the vehicle is maximized by maximizing the flow rate to the radiator.

Further, it is determined whether the coolant temperature drops to the fifth target temperature or lower in a state that the operation angle of the flow control valve 1 is in the maximum cooling section D (S150), and when it is satisfied, the operation area of the engine is check (S160), and when it is determined that the engine is operated in an area exceeding the second engine operation map MAP2, the operation angle of the flow control valve 1 enters the second variable operation section E (S100), but when the engine is operated in the second engine operation map MAP2, the operation angle of the flow control valve 1 enters the first variable operation section C (S120).

That is, it is determined whether the operation angle of the flow control valve 1 to move to the second variable operations section E in which separate cooling is stopped or the first variable operation section C in which separate cooling is performed, depending on the area where the engine is operated with respect to the second engine operation map MAP2.

The reason of setting different temperatures for entering the first and second variable operation section from the maximum cooling section D and entering the maximum cooling section D from the first and second variable operation section is for preventing frequent switching among the sections depending on the change of the coolant temperature, that is, increasing the control efficiency by applying hysteresis.

Further, it is determined whether the engine is operated in the third engine operation map MAP2 in a state that the operation angle of the flow control valve 1 is in the second variable operations section E (S130), and when it is satisfied, the operation angle of the flow control valve 1 moves to the first variable operation section C and separation cooling is applied (S100).

In this case, the reference engine operation area (third engine operation map) for the operation angle of the flow control valve 1 to move from the second variable operation section E to the first variable operation section C is set smaller than the reference engine operation area (second engine operation map) for the operation angle of the flow control valve 1 to move from the first variable operation section C to the second variable operation section E, in order to prevent frequent switch between the first variable operation section C and the second variable operation section E, that is, increase the control efficiency by applying hysteresis of the area where separation cooling is applied.

Further, an error occurs in the flow control valve 1, the controller of the flow control valve performs fail-safe by moving the valve to a predetermined section (for example, the maximum cooling section).

Further, when the engine is stopped, the flow control valve is moved to the section where all of the ports of the flow control valve are opened in order to supplement coolant when the engine is overheated or to be repaired later.

The position (angle) of the flow control valve according to the present invention is briefly described again. When the engine is stopped or ignition-on before the engine is started, the operation angle of the flow control valve enters a section where all the ports of the flow control valve are opened, but the positions may be different.

Further, a constant angle that is fixed for the condition in which all the ports of the valve are closed is given in the flow stop section.

Further, in the warming-up section and the heating priority operation section, as the coolant temperature increases, the angle of the valve gradually changes, so the ports for the oil heat exchanger or the EGR cooler and the heater core are gradually opened with the port for the radiator closed.

Further, in the heating priority operation section, the port for the oil heat exchanger or the EGR cooler is gradually opened with the port for the heater core fully open, as the coolant temperature is increased.

Further, in the first and second variable operation sections, the angle of the valve is changed in accordance with values obtained from feedback control such as a PID control function.

As described above, according to the present invention, 4-port control that simultaneously controls three outlet ports and one inlet port 21 by operating only the flow control valve 1 is possible, so it is possible to improve fuel efficiency through separate cooling. Further, since there is no need for a specific port control configuration for separate cooling, the manufacturing costs are reduced.

Further, various control sections of the flow control valve 1 are provided, depending on the operation conditions of a vehicle and the flow control valve is operated sequentially through the control sections, so the operation distance and the number of times of operation of the flow control valve 1 are reduced.

Further, since the heating priority operation section F is set, it is possible to maximize the flow rate to the heater core 80 and prevent unnecessary loss of coolant that is supplied to the oil heat exchanger or the EGR cooler 70, so the fuel efficiency is improved and the heating performance is maximized.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A flow control valve that is independently connected to a coolant outlet of a cylinder block and a coolant outlet of a cylinder head, has an inlet port connected to the coolant outlet of the cylinder block, and has at least three outlet ports for discharging the coolant from an engine,
   wherein the at least three outlet ports include a first outlet port connected to a radiator,
   the flow control valve is configured that an opening rate of the first outlet port is symmetrically changed in a first direction and a second direction from a mid-operation angle of an entire operation angle of the flow control valve,
   the opening rate of the first outlet port is maximized in the mid-operation angle of the flow control valve,
   the entire operation angle of the flow control valve includes a first operation limit angle, the mid-operation angle, and a second operation limit angle, and
   the first operation limit angle is an angle at a first end of the entire operation angle of the flow control valve, the second operation limit angle is an angle at a second end of the entire operation angle of the flow control valve, and the mid-operation angle is an angle in a range between the first operation limit angle and the second operation limit angle such that the first outlet port is symmetrically opened and closed in the first direction and the second direction from the mid-operation angle.

2. The flow control valve of claim 1, wherein the opening rate of the first outlet port gradually decreases, as the flow control valve is operated such that an operation angle of the flow control valve enters the first direction or the second direction from a maximum cooling section including the mid-operation angle.

3. The flow control valve of claim 2, wherein the opening rate of the first outlet port is minimized before the operation angle of the flow control valve reaches the first end and the second end from the maximum cooling section.

4. The flow control valve of claim 2, wherein an opening rate of the inlet port becomes minimum and maximum, as the flow control valve is operated in the first direction and the second direction, respectively, from the mid-operation angle of the flow control valve.

5. The flow control valve of claim 4, wherein the at least three outlet ports include a second outlet port connected to an oil heat exchanger or an EGR cooler, and a third outlet port connected to a heater core, and opening rates of the second outlet port and the third outlet port are set such that the second outlet port and the third outlet port are partially opened in the maximum cooling section.

6. The flow control valve of claim 4, wherein the at least three outlet ports include a second outlet port connected to an oil heat exchanger or an EGR cooler, and a third outlet port connected to a heater core, and the opening rates of all of the first outlet port, the second outlet port, the third outlet port, and the inlet port are set to be minimum in a flow stop section including the first operation limit angle.

7. The flow control valve of claim 6, wherein when the operation angle of the flow control valve is in a warming-up section between the flow stop section and the mid-operation angle, the opening rates of the first outlet port and the inlet port are minimum, the opening rate of the second outlet port is changed between the minimum and the maximum, depending on an operation angle change of the flow control valve, and the opening rate of the third outlet port is changed, depending on the operation angle change of the flow control valve.

8. The flow control valve of claim 7, wherein, when the operation angle of the flow control valve is in the warming-up section, the opening rate of the second outlet port gradually increases, as the flow control valve is operated from the first operation limit angle to the mid-operation angle, and the opening rate of the third outlet port is gradually increased and then maintained at a predetermined opening rate that is smaller than a maximum opening rate, as the flow control valve is operated from the first operation limit angle to the mid-operation angle.

9. The flow control valve of claim 7, wherein, when the operation angle of the flow control valve is in a first variable operation section between the warming-up section and the maximum cooling section, the opening rate of the first outlet port is changed between the minimum and the maximum, depending on the operation angle change of the flow control valve, the opening rate of the second outlet port is maximum, the opening rate of the third outlet port is set such that the third outlet port is partially opened, and the opening rate of the inlet port is minimum.

10. The flow control valve of claim 9, wherein, when the operation angle of the flow control valve is in the first variable operation section, the opening rate of the first outlet port gradually increases, as the flow control valve is operated along a direction from the first operation limit angle to the mid-operation angle.

11. The flow control valve of claim 9, wherein the at least three outlet ports include the third outlet port connected to the heater core, and an opening rate of the third outlet port is maximum in a heating priority operation section including the second operation limit angle.

12. The flow control valve of claim 11, wherein, when the operation angle of the flow control valve is in the heating priority operation section, the opening rate of the first outlet port is minimum, the opening rate of the second outlet port is changed between the minimum and the maximum, depending on the operation angle change of the flow control valve, and the opening rate of the inlet port is maximum.

13. The flow control valve of claim 12, wherein, when the operation angle of the flow control valve is in the heating priority operation section, the opening rate of the second outlet port gradually increases, as the flow control valve is operated along a direction from the second operation limit angle to the mid-operation angle.

14. The flow control valve of claim 12, wherein, when the operation angle of the flow control valve is in a second variable operation section between the heating priority operation section and the maximum cooling section, the opening rate of the first outlet port is changed between the minimum and the maximum, depending on the operation angle change of the flow control valve, and the opening rates of the second outlet port and the third outlet port are changed, depending on the operation angle change of the flow control valve, and the opening rate of the inlet port is maximum.

15. The flow control valve of claim 14, wherein, when the operation angle of the flow control valve is in the second variable operation section, the opening rate of the first outlet port gradually increases, as the flow control valve is operated along a direction from the second operation limit angle to the mid-operation angle, the opening rate of the second outlet port is maintained at the maximum opening rate and then gradually decreased over the minimum opening rate, and the opening rate of the third outlet port gradually decreases over the minimum opening rate, as the flow control valve is operated along the direction from the second operation limit angle to the mid-operation angle.

16. The flow control valve of claim 14, further comprising a controller that maintains the operation angle of the flow control valve in the flow stop section when the engine is started and coolant temperature is a reference temperature or higher.

17. The flow control valve of claim 16, wherein the controller positions the operation angle of the flow control valve to a first warming-up section bordering on the flow stop section of the warming-up section, when the coolant temperature is equal to or higher than a first target temperature that is higher than the reference temperature in a state that the operation angle of the flow control valve is in the flow stop section, and positions the operation angle of the flow control valve to a second warming-up section bordering on the first variable operation section of the warming-up section, when the coolant temperature is equal to or higher than a second target temperature that is higher than the first target temperature, a heater is turned on, or the engine is currently operated in an area exceeding a first engine operation map determined from relationship between an engine speed and an engine load, in a state that the operation angle of the flow control valve is in the first warming-up section.

18. The flow control valve of claim 17, wherein, when the operation angle of the flow control valve is in the warming-up section, the controller controls the flow control valve such that as the coolant temperature increases, the opening rate of the second outlet port gradually increases.

19. The flow control valve of claim 16, wherein when the heater is turned on or the engine is operated in an area exceeding a first engine operation map determined from relationship between an engine speed and an engine load in the flow stop section, the controller positions the operation angle of the flow control valve to a second warming-up section bordering on the first variable operation section of the warming-up section.

20. The flow control valve of claim 17, wherein when the coolant temperature is equal to or higher than a third target temperature that is higher than the second target temperature or the engine is currently operated in an area exceeding a second engine operation map that is smaller than the first engine operation map in the second warming-up section, the controller positions the operation angle of the flow control valve to the first variable operation section.

21. The flow control valve of claim 20, wherein the controller positions the operation angle of the flow control valve to the maximum cooling section when the coolant temperature is equal to or higher than a fourth target temperature that is higher than the third target temperature in a state that the operation angle of the flow control valve is in the first variable operation section, and positions the operation angle of the flow control valve to the first variable operation section when the coolant temperature is equal to or lower than a fifth target temperature that is lower than the fourth target temperature and the engine is currently operated in the second engine operation map in a state that the operation angle of the flow control valve is in the maximum cooling section.

22. The flow control valve of claim 20, wherein the controller positions the operation angle of the flow control valve to the second variable operation section when the engine is currently operated in an area exceeding the second engine operation map in a state that the operation angle of the flow control valve is in the first variable operation section, and positions the operation angle of the flow control valve to the first variable operation section when the engine is currently operated in a third engine operation map that is smaller than the second engine operation map in a state that the operation angle of the flow control valve is in the second variable operation section.

23. The flow control valve of claim 22, wherein the controller positions the operation angle of the flow control valve to the maximum cooling section when the coolant temperature is equal to or higher than a fourth target temperature that is higher than the third target temperature in a state that the operation angle of the flow control valve is in the second variable operation section, and positions the operation angle of the flow control valve to the second variable operation section when the coolant temperature is equal to or lower than a fifth target temperature that is lower than the fourth target temperature and the engine is currently operated in an area exceeding the second engine operation map in a state that the operation angle of the flow control valve is in the maximum cooling section.

24. The flow control valve of claim 16, wherein when the engine is started and the coolant is lower than the reference temperature, the controller positions the operation angle of the flow control valve to the heating priority operation section.

25. The flow control valve of claim 24, wherein, when the operation angle of the flow control valve is in the warming-up section, when the coolant temperature is equal to or higher than a sixth target temperature that is higher than the reference temperature, the controller controls the flow control valve such that as the coolant temperature increases, the opening rate of the second outlet port gradually increases.

26. The flow control valve of claim 24, wherein when the coolant temperature is equal to or higher than a seventh target temperature that is higher than the reference temperature, the controller positions the operation angle of the flow control valve to the second warming-up section bordering on the first variable operation section.

27. The flow control valve of claim 16, wherein when the engine is in from a stop state to an ignition-on state before starting, the controller positions the flow control valve to a section in which all of the ports of the flow control valve are at least partially open.

28. The flow control valve of claim 16, wherein when a signal showing a malfunction of the flow control valve is input, the controller positions the flow control valve to a section in which all of the ports of the flow control valve are at least partially open.

29. The flow control valve of claim 1, wherein the at least three outlet ports include:
a second outlet port connected to an oil heat exchanger or an EGR cooler; and
a third outlet port connected to a heater core.

30. A method of controlling a flow control valve that is independently connected to a coolant outlet of a cylinder block and a coolant outlet of a cylinder head, has an inlet port connected to the coolant outlet of the cylinder block to receive a coolant, and has at least three outlet ports for discharging the coolant from an engine, in which the at least three outlet ports include a first outlet port connected to a radiator, and the first outlet port is symmetrically opened and closed in a first direction and a second direction from a mid-operation angle of an entire operation angle of the flow control valve,
wherein the first outlet port is fully open in the mid-operation angle of the flow control valve,
the entire operation angle of the flow control valve includes a first operation limit angle, the mid-operation angle, and a second operation limit angle, and
the first operation limit angle is an angle at a first end of the entire operation angle of the flow control valve, the second operation limit angle is an angle at a second end of the entire operation angle of the flow control valve, and the mid-operation angle is an angle in a range between the first operation limit angle and the second operation limit angle such that the first outlet port is symmetrically opened and closed in the first direction and the second direction from the mid-operation angle.

31. The method of claim 30, wherein an opening rate of the first outlet port gradually decreases, as the flow control valve is operated in the first direction or the second direction from a state that the operation angle of the flow control valve is in a maximum cooling section including the mid-operation angle of the flow control valve.

32. The method of claim 30, wherein the inlet port is fully closed when the flow control valve is operated in the first direction from the mid-operation angle, and is fully opened when the flow control valve is operated in the second direction.

33. The flow control valve of claim 1, wherein the mid-operation angle is 135° C. and the entire operation angle of the flow control valve is 270° C.

\* \* \* \* \*